(12) United States Patent
Chen et al.

(10) Patent No.: US 11,009,883 B2
(45) Date of Patent: May 18, 2021

(54) OPERATION CONTROL SYSTEM

(71) Applicant: MAZDA MOTOR CORPORATION, Hiroshima (JP)

(72) Inventors: Yingchuan Chen, Hiroshima (JP); Masahiro Fujii, Hatsukaichi (JP); Kenji Honda, Aki-gun (JP); Tomiyuki Yamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 42 days.

(21) Appl. No.: 16/568,785

(22) Filed: Sep. 12, 2019

(65) Prior Publication Data

US 2020/0103908 A1 Apr. 2, 2020

(30) Foreign Application Priority Data

Sep. 28, 2018 (JP) .............................. JP2018-183992

(51) Int. Cl.
*G05D 1/02* (2020.01)
*G08G 1/00* (2006.01)
(Continued)

(52) U.S. Cl.
CPC ....... *G05D 1/0214* (2013.01); *B60W 30/0956* (2013.01); *G01C 21/34* (2013.01);
(Continued)

(58) Field of Classification Search
CPC .......... G05D 1/00; G05D 1/0088; G05D 1/02; G05D 1/0231; G05D 1/0234; G05D 1/0236; G05D 1/0238; G05D 1/024; G05D 1/0242; G05D 1/0246; G05D 1/0248; G05D 1/0274; G05D 1/0276; G05D 1/0278; G05D 3/00; G05D 3/12; G05D 2201/00; G05D 2201/0207; G05D 2201/0215; G05D 2201/0216; G05D 2201/0211; H04W 4/00; H04W 4/02; H04W 4/12; H04W 4/18; H04W 4/021; H04W 4/029; H04W 4/33; H04W 4/38; H04W 4/40; H04W 8/00;
(Continued)

(56) References Cited

U.S. PATENT DOCUMENTS

2005/0038575 A1* 2/2005 Wu .......................... B61L 27/04
701/19

FOREIGN PATENT DOCUMENTS

JP 2011-227716 A 11/2011

* cited by examiner

*Primary Examiner* — Anthony R Jimenez
(74) *Attorney, Agent, or Firm* — Studebaker & Brackett PC

(57) ABSTRACT

An operation control system includes: a first detector that detects a transport body that has reached a predetermined reference position on a first transport line; an obstacle sensor and an autonomous traveling control unit provided in each of a plurality of self-propelled carrier bodies traveling on a second transport line; a gate provided on the second transport line; and a gate driving unit that moves the gate to a retracted position when the first detector detects the transport body, and moves the gate to an advanced position when the first detector does not detect the transport body. The autonomous traveling control unit controls the travel of the carrier bodies such that a forward separation distance, a distance between any of the carrier bodies and another carrier body or an obstacle ahead of the carrier body, is equal to or greater than a predetermined collision prevention distance.

4 Claims, 14 Drawing Sheets

(51) Int. Cl.
*B60W 30/095* (2012.01)
*G08G 1/16* (2006.01)
*G01C 21/34* (2006.01)

(52) U.S. Cl.
CPC ........... *G05D 1/0289* (2013.01); *G08G 1/163* (2013.01); *G08G 1/20* (2013.01); *B60W 2554/00* (2020.02)

(58) Field of Classification Search
CPC .. H04W 8/08; H04W 8/22; G06F 3/00; G06F 3/0116; G06F 19/00; G01S 5/00; G01S 5/0009; G01S 5/0063; G01S 5/016; G01S 5/013; G01C 21/32; G01C 21/00; G01C 21/005; G01C 21/20; B60W 2520/06; B60W 2550/00; B60W 2550/10; B60W 2550/40; B60W 2554/00; B60W 30/0956
USPC ........................................................ 701/446
See application file for complete search history.

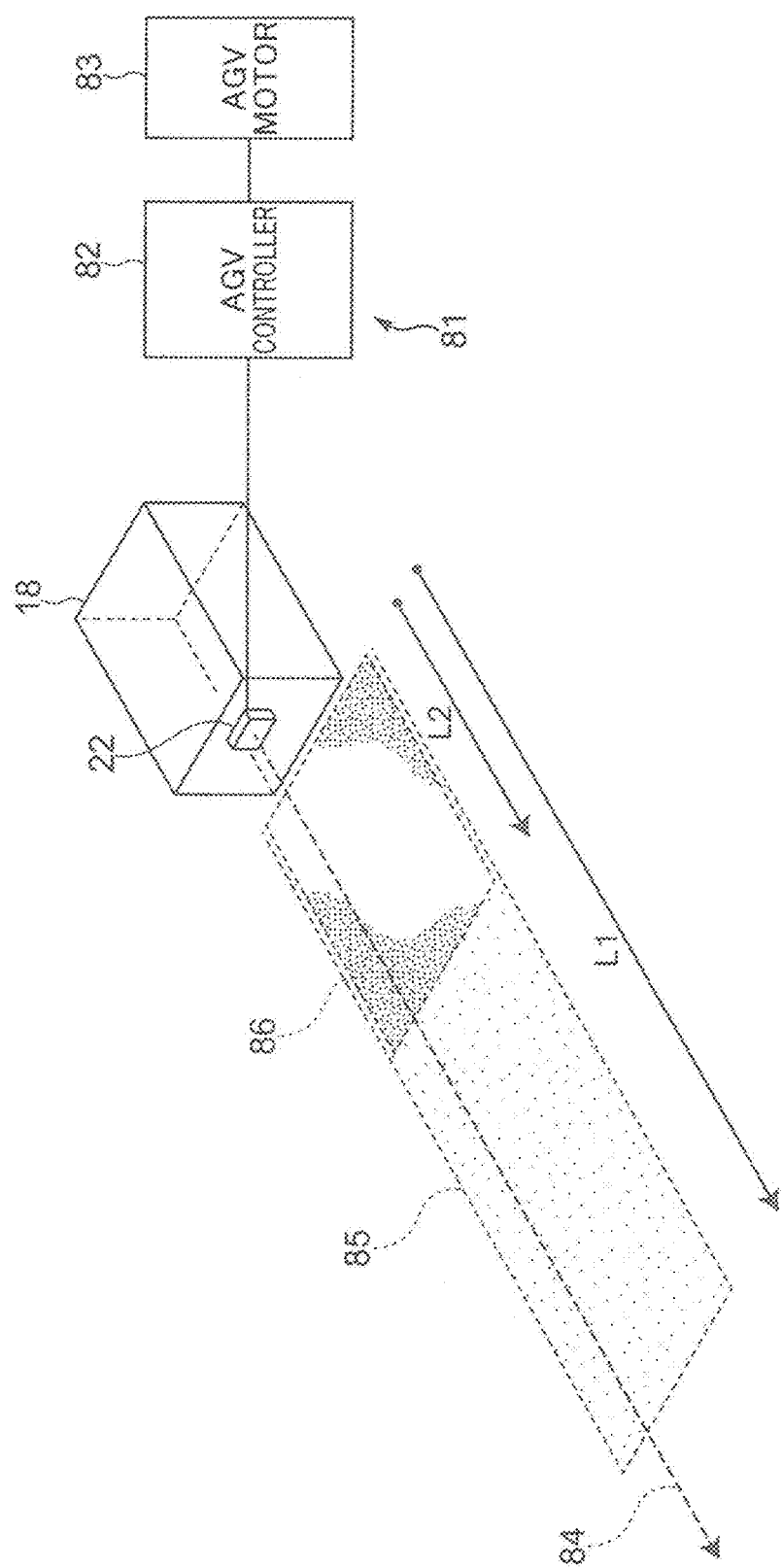

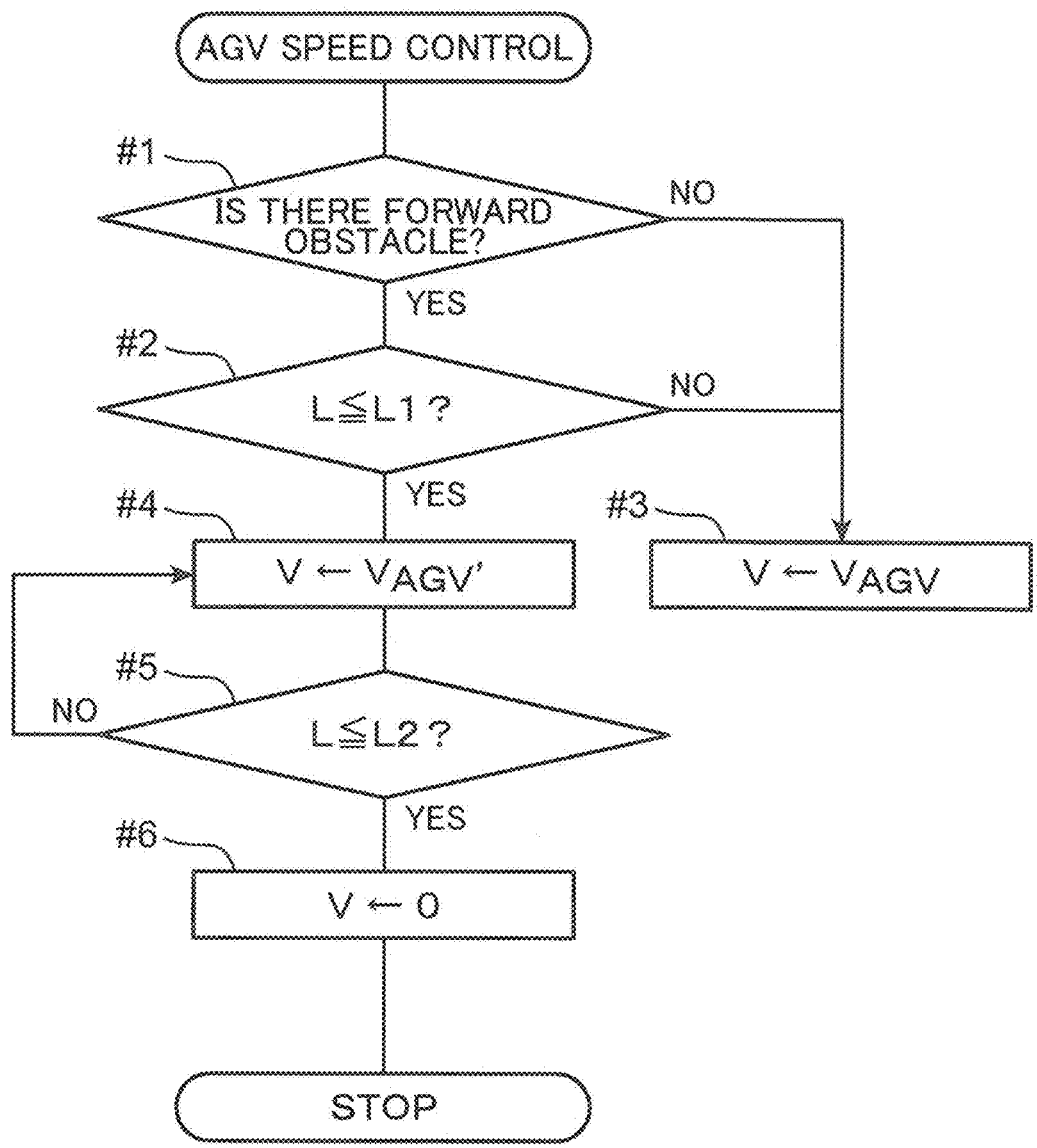

OPERATION CONTROL SYSTEM

TECHNICAL FIELD

The present invention relates to an operation control system of self-propelled carrier bodies.

BACKGROUND ART

Many self-propelled carrier bodies are used as a parts transport device in a manufacturing facility that assembles products such as automobiles. Examples of the representative self-propelled carrier body include an automatic guided vehicle (hereinafter abbreviated as "AGV"). As is well known, the AGV is controlled, for example, to travel along an individual guidance line such as a magnetic tape placed on a floor surface in order to supply necessary parts or the like to work-in process that is transported by a transport mechanism such as a conveyor. For example, Japanese Patent Application Laid-Open No. 2011-227716 discloses an operation control system that allows an AGV to travel on the guidance line by a necessary amount when necessary.

In such an operation control system, generally, wireless communication and a centralized control computer are used as a method of controlling the AGV, and a plurality of AGVs is electronically subjected to centralized control. However, this method can actually cause various problems. For example, crosstalk with other radio communication may hamper communication for AGV control. An error in positional information of some AGVs may cause a discrepancy between an AGV operation plan and an actual operation situation. Furthermore, a failure in the centralized control computer may disable the whole operation control system from functioning. The occurrence of these problems may result in the inability to operate the AGV normally. In some cases, the occurrence of AGV congestion may hinder production.

In order to speed up the work of assembling parts to a product flowing on a production line, the AGV transporting the parts preferably travels in synchronization with the corresponding product or a transport body (palette or the like) on which the product is loaded. If the product and the AGV are not synchronized, an assembly worker needs to travel a long distance to take out the parts from the AGV, increasing the time needed for the assembly.

SUMMARY OF INVENTION

Therefore, an object of the present invention is to provide an operation control system that can transport a plurality of AGVs in synchronization with the product (transport body) corresponding to each AGV without being affected by radio interference, an error in positional information, or a failure of the centralized control computer.

In order to achieve the object described above, the present invention provides an operation control system to be applied to a facility including: a first transport line on which a plurality of transport bodies is transported by a transport mechanism at a predetermined reference speed while being separated at a predetermined reference distance; and a second transport line on which a plurality of self-propelled carrier bodies travels, the second transport line being provided in parallel to the first transport line, the operation control system causing the plurality of carrier bodies to travel in synchronization with the plurality of transport bodies. The operation control system includes: an obstacle sensor provided in each of the plurality of carrier bodies and configured to detect an obstacle present ahead of each of the carrier bodies; an autonomous traveling control unit provided in each of the plurality of carrier bodies and configured to control the travel of each of the carrier bodies based on an input signal from the obstacle sensor; a gate provided on the second transport line and movable between an advanced position advanced to a detection range by the obstacle sensor and a retracted position out of the detection range by the obstacle sensor; a first detector configured to detect each of the transport bodies that has reached a predetermined reference position on the first transport line; and a gate driving unit configured to move the gate to the retracted position when the first detector detects the transport body, and to move the gate to the advanced position when the first detector does not detect the transport body. When a distance between any of the carrier bodies and another carrier body or the obstacle ahead of the carrier body is a forward separation distance, the autonomous traveling control unit controls the travel of the carrier body such that the forward separation distance is equal to or greater than a predetermined collision prevention distance. The gate is disposed at a position where the carrier body having reached a position separated to an upstream side from the gate by the collision prevention distance on the second transport line, and the transport body having reached the reference position on the first transport line are side by side.

BRIEF DESCRIPTION OF DRAWINGS

FIG. 3 is a schematic diagram for describing an electric configuration of an AGV;

FIG. 4 is a flowchart showing a procedure for controlling travel of the AGV;

DESCRIPTION OF EMBODIMENTS

An embodiment of an operation control system of the present invention will be described below with reference to the accompanying drawings.

[Manufacturing Facility]

Figure 1:
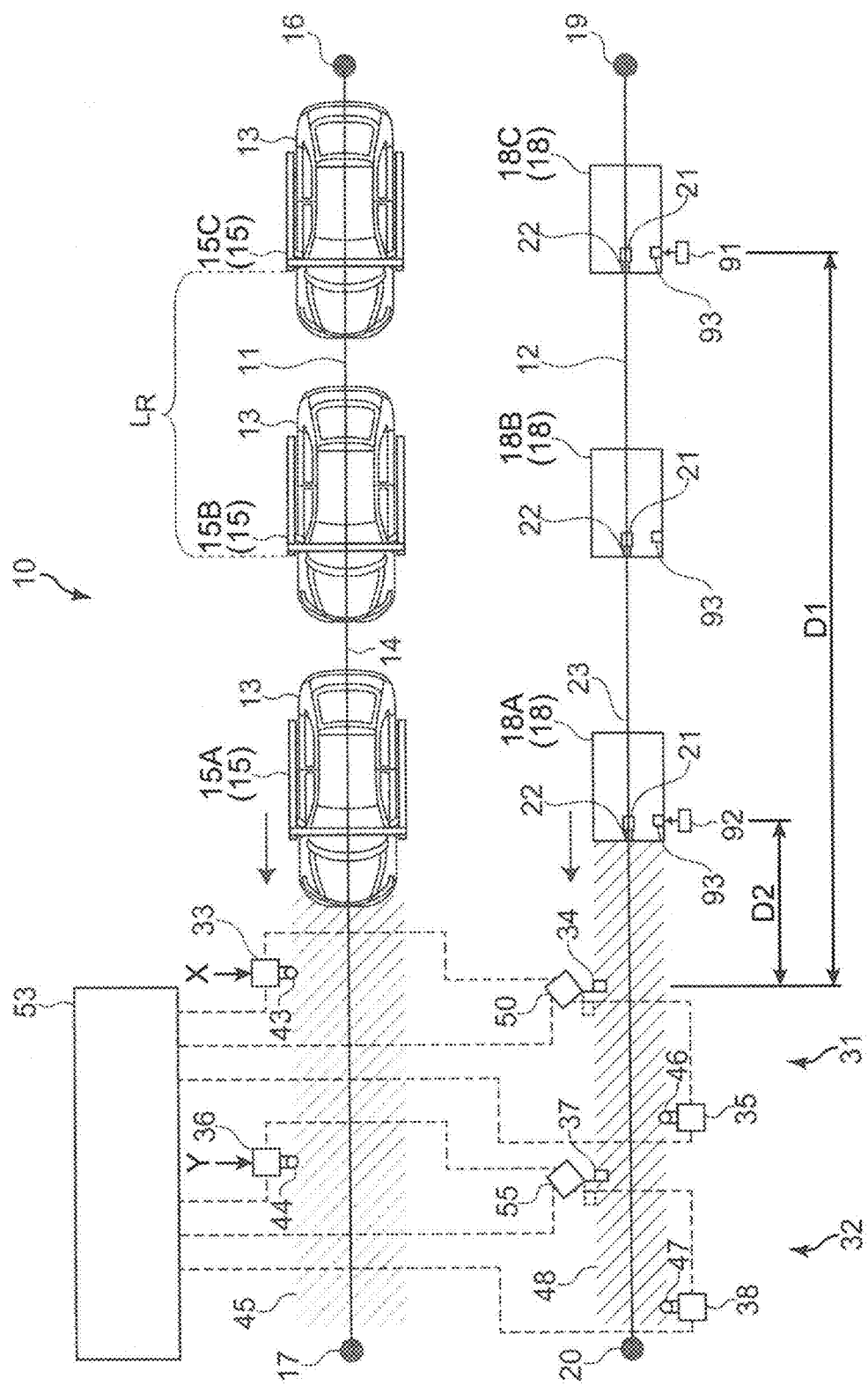
FIG. 1 is a plan view showing a schematic configuration of an operation control system according to one embodiment of the present invention.

FIG. 1 is a plan view showing a schematic configuration of an operation control system 10 according to one embodiment of the present invention. As shown in FIG. 1, the operation control system 10 is applied to a manufacturing facility in which a first transport line 11 (production line) and a second transport line 12 (parts transport line) are installed in parallel. The operation control system 10 controls travel of self-propelled parts-transporting automatic guided vehicles 18 (hereinafter referred to as "AGV 18") traveling along the second transport line 12. The manufacturing facility in the present embodiment is a manufacturing plant that manufactures automobiles.

The first transport line 11 is a production line on which products 13 (automobiles) being assembled are transported. The first transport line 11 includes a conveyor 14 (transport mechanism) that transports the products 13. The conveyor 14 is a transport mechanism that transports a plurality of palettes (or carriages) 15A, 15B, 15C, . . . on which the products 13 are loaded. The plurality of palettes 15A, 15B, 15C . . . is arranged along the first transport line 11 so as to be spaced apart from each other by a constant distance (reference distance $L_R$), and is transported by the conveyor 14 to move at a constant reference speed ($V_R$) from a first production point 16 on the right side (upstream side) of FIG. 1 to a second production point 17 on the left side (downstream side) of FIG. 1. Note that each of the palettes 15A, 15B, 15C, . . . corresponds to "transport body" in the present invention.

The second transport line 12 is a parts transport line on which a plurality of AGVs 18A, 18B, 18C, . . . on which parts are loaded travels. The second transport line 12 is disposed to extend in parallel with the first transport line 11, and connects a first transport point 19 on the right side (upstream side) of FIG. 1 to a second transport point 20 on the left side (downstream side) of FIG. 1. Note that each of the AGVs 18A, 18B, 18C . . . corresponds to the "carrier body" in the present invention.

Here, in FIG. 1, three palettes 15A, 15B, and 15C are illustrated between the first production point 16 and the second production point 17 for the sake of simplicity, and correspondingly, three AGVs 18A, 18B, and 18C are illustrated between the first transport point 19 and the second transport point 20. However, the number of palettes and the number of AGVs are not restrictive, and it is possible to arrange a large number of palettes and a large number of corresponding AGVs on each of the lines 11 and 12. Hereinafter, the plurality of palettes 15A, 15B, 15C, . . . , when referred to without distinction, is simply referred to as the palette 15, and the plurality of AGVs 18A, 18B, 18C, . . . , when referred to without distinction, is simply referred to as the AGV 18.

The moving speed of the conveyor 14 on the first transport line 11, that is, the speed at which the conveyor 14 transports the palette 15 (product 13) is constant. The transport speed of the palette 15 by the conveyor 14 (product transport speed) is referred to as "reference speed $V_R$." The AGV 18 can travel at a first speed $V_{AGV}$ higher than the reference speed $V_R$. However, if a distance between the AGV 18 and another AGV traveling ahead or an obstacle is equal to or less than a predetermined distance, the AGV 18 is controlled to travel at a second speed $V_{AGV'}$ lower than the first speed $V_{AGV}$ in order to prevent collision or touch with the other AGV or the obstacle (details will be described later).

[AGV]

On the second transport line 12, a magnet tape serving as a guidance line for guiding the travel of AGV 18 is laid in a line. The AGV 18 includes a magnetic sensor 21 that detects a magnetic flux of the magnet tape, and travels autonomously on the second transport line 12 while detecting the magnet tape with the magnetic sensor 21. The magnetic sensor 21 is installed on a lower surface of the AGV 18 and at a position overlapping with a central axis 23 (central axis along a traveling direction) of the AGV 18 in plan view.

As shown in FIG. 3, the AGV 18 includes a speed control system 81 that autonomously controls the travel speed while confirming whether there is an obstacle ahead of the AGV 18. The speed control system 81 includes an obstacle sensor 22 that detects an obstacle ahead of the AGV 8, an AGV motor 83 that is a power source of the AGV 18, and an AGV controller 82 that controls the AGV motor 83. The obstacle sensor 22 and the AGV controller 82 are connected by wire or wirelessly so as to be able to communicate with each other. Note that the AGV controller 82 corresponds to "autonomous traveling control unit" in the present invention.

Figure 6:
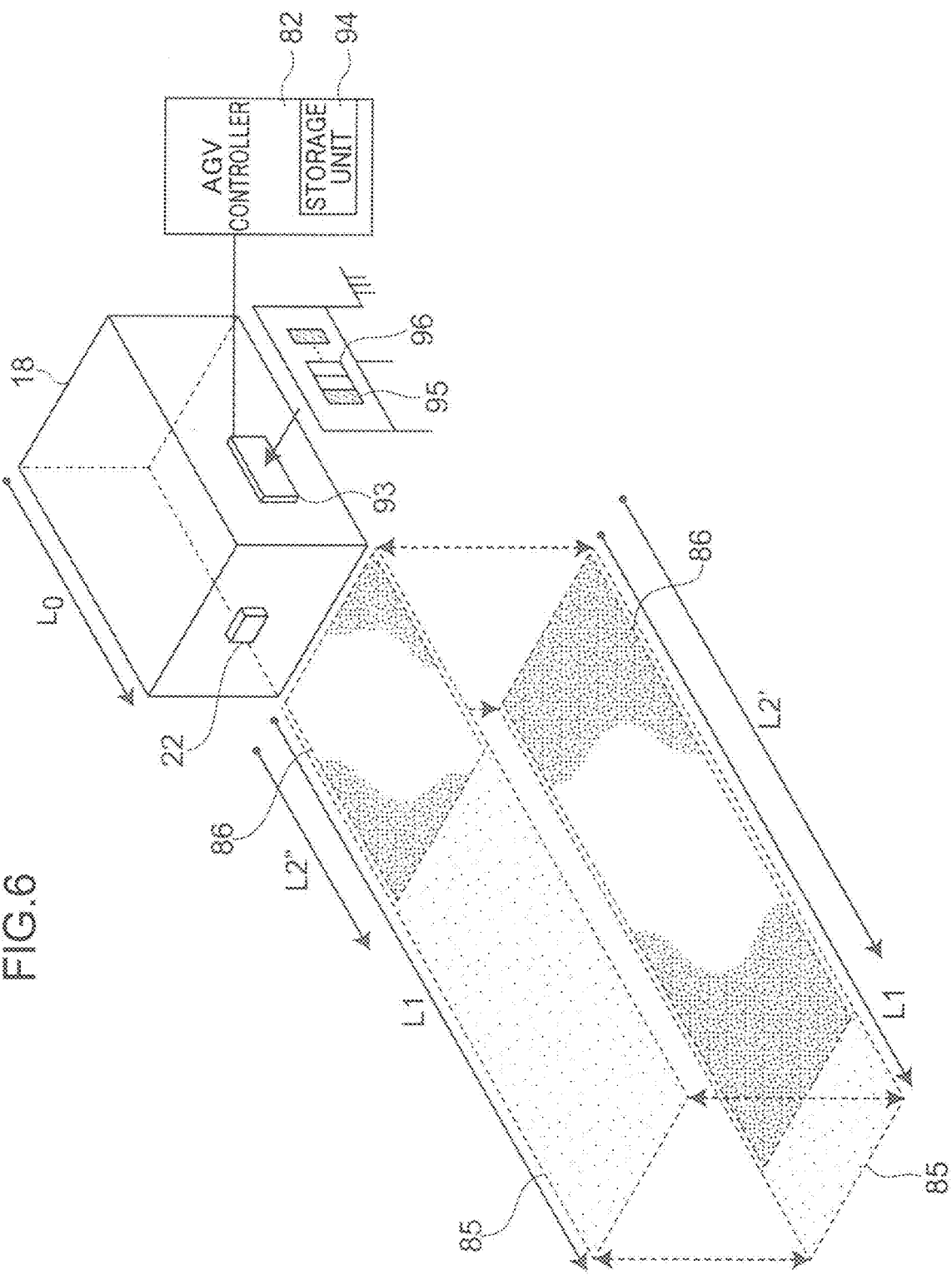
FIG. 6 is a schematic diagram for describing that an operation mode is switched depending on a position of the AGV.

The obstacle sensor 22 can detect an obstacle present ahead of the AGV 18 (for example, gates 34 and 37 described later) and other AGVs traveling ahead of the AGV 18. As shown in FIGS. 1, 3, and 6, the obstacle sensor 22 is installed on a front surface (surface on a front side in the traveling direction) of the AGV 18 and at a position overlapping with the central axis 23 of the AGV 18 in plan view. As the obstacle sensor 22, for example, a laser or infrared range sensor is used, but any sensor can be used as long as the sensor can detect the presence of a forward obstacle.

[Control Device]

As shown in FIG. 1, the operation control system 10 includes two sets of control devices, that is, a first control device 31 and a second control device 32, in order to control the travel of the AGV 18.

The first control device 31 includes a first limit switch 33, a first gate 34 and a second limit switch 35. The first limit switch 33 is disposed in a vicinity of an upstream side of the second production point 17 on the first transport line 11. The first gate 34 and the second limit switch 35 are disposed in a vicinity of an upstream side of the second transport point 20 on the second transport line 12.

The second control device 32 includes a third limit switch 36, a second gate 37 and a fourth limit switch 38. The third limit switch 36 is disposed between the first limit switch 33 and the second production point 17 on the first transport line 11. The second gate 37 is disposed between the first gate 34 and the second transport point 20 on the second transport line 12. The fourth limit switch 38 is disposed between the second limit switch 35 and the second transport point 20 on the second transport line 12.

Note that the first limit switch 33, the first gate 34, and the second limit switch 35 correspond to "first detector", "gate", and "second detector" in the present invention, respectively. Similarly, the third limit switch 36, the second gate 37, and the fourth limit switch 38 also correspond to "first detector", "gate", and "second detector" in the present invention, respectively.

The first to fourth limit switches 33, 35, 36, and 38 are pneumatic (mechanical) limit switches, and switch a flow of compressed air in a pneumatic circuit described later by touching an object.

The first limit switch 33 detects that the palette 15 on which the product 13 is loaded has reached the vicinity of the upstream side of the second production point 17 on the first transport line 11. Hereinafter, an arrival point of the palette 15 detected by the first limit switch 33 (X in FIG. 1) is referred to as a first reference position X. The first limit switch 33 is installed at a position where the first limit switch 33 can touch the palette 15 that has reached the first reference position X on the first transport line 11.

The third limit switch 36 detects that the palette 15 on which the product 13 is loaded has reached a position between the first reference position X (first limit switch 33) and the second production point 17 on the first transport line 11, that is, the palette 15 has reached a position closer to the second production point 17 than to the first reference position X. Hereinafter, an arrival point of the palette 15 detected by the third limit switch 36 (Y in FIG. 1) is referred to as a second reference position Y. The third limit switch 36 is installed at a position where the third limit switch 36 can touch the palette 15 that has reached the second reference position Y on the first transport line 11.

The second limit switch 35 detects that the AGV 18 has reached the vicinity of the upstream side of the second transport point 20 on the second transport line 12. A distance between the second transport point 20 and the second limit switch 35 in the upstream-downstream direction is shorter than a distance between the second production point 17 and the first limit switch 33 (first reference position X) in the upstream-downstream direction. That is, the second limit switch 35 is installed at a position where the second limit switch 35 can touch the AGV 18 that has reached a slightly downstream side from the position corresponding to the first reference position X on the second transport line 12.

The fourth limit switch 38 detects that the AGV 18 has reached a position between the second limit switch 35 and the second transport point 20 on the second transport line 12, that is, the AGV 18 has reached a position closer to the second transport point 20 than to the second limit switch 35. A distance between the second transport point 20 and the fourth limit switch 38 in the upstream-downstream direction is shorter than a distance between the second production point 17 and the third limit switch 36 (second reference position Y) in the upstream-downstream direction. That is, the fourth limit switch 38 is installed at a position where the fourth limit switch 38 can touch the AGV 18 that has reached a slightly downstream side from the position corresponding to the second reference position Y on the second transport line 12.

The first and third limit switches 33 and 36 are disposed on a right side of a palette passage area 45, which is an area through which the palette 15 passes on the first transport line 11, when the first transport line 11 is viewed from the upstream side. The first and third limit switches 33 and 36 include heads 43 and 44 projecting in the palette passage area 45, respectively, and detect the presence of the palette 15 by the heads 43 and 44 touching the palette 15.

The second and fourth limit switches 35 and 38 are disposed on a left side of an AGV passage area 48, which is an area through which the AGV 18 passes on the second transport line 12, when the second transport line 12 is viewed from the upstream side. The second and fourth limit switches 35 and 38 include heads 46 and 47 projecting in the AGV passage area 48, respectively, and detect the presence of the AGV 18 by the heads 46 and 47 touching the AGV 18.

The first gate 34 is disposed in a vicinity of the upstream side of the second transport point 20 on the second transport line 12 and slightly upstream from the second limit switch 35. The second gate 37 is disposed between the second transport point 20 and the first gate 34 on the second transport line 12 (position closer to the second transport point 20 than to the first gate 34). The first and second gates 34 and 37 are disposed on a right side of the AGV passage area 48 when the second transport line 12 is viewed from the upstream side. The first and second gates 34 and 37 are for controlling (prohibiting/permitting) the travel of the AGV 18. The first and second gates 34 and 37 are movable between an advanced position advanced to the AGV passage area 48 (position shown by a solid line in FIG. 1) and a retracted position retracted from the AGV passage area 48 (position shown by a broken line in FIG. 1).

When the first gate 34 (second gate 37) is at the advanced position, the AGV 18 traveling on the upstream side of the first gate 34 (second gate 37) detects the first gate 34 (second gate 37) with the obstacle sensor 22. On the other hand, when the first gate 34 (second gate 37) is at the retracted position, the AGV 18 traveling on the upstream side of the first gate 34 (second gate 37) cannot detect the first gate 34 (second gate 37) with the obstacle sensor 22. In other words, the first gate 34 (second gate 37) is movable between the advanced position advanced to a detection range by the obstacle sensor 22 and the retracted position out of the detection range by the obstacle sensor 22.

The first control device 31 further includes a gate driving unit 50 that moves the first gate 34 between the retracted position and the advanced position. As shown in FIGS. 2A to 2D, the gate driving unit 50 includes a pneumatic cylinder 51, a direction control valve 52, and a compressor 53, which is a source of compressed air. The pneumatic cylinder 51, the direction control valve 52, the compressor 53, and the first and second limit switches 33 and 35 described above constitute one pneumatic circuit (power transmission circuit) 54. The pneumatic circuit 54 is designed such that the first gate 34 moves between the advanced position and the retracted position in response to operations of the limit switches 33 and 35. Note that the pneumatic cylinder 51 corresponds to "cylinder device" in the present invention.

The second control device 32 further includes a gate driving unit 55 that moves the second gate 37 between the retracted position and the advanced position. The gate driving unit 55 is similar to the gate driving unit 50 for the first gate 34 described above in structure. Pneumatic parts constituting the gate driving unit 55 (pneumatic cylinder, direction control valve, and compressor) constitute a pneumatic circuit similar to the above-described pneumatic circuit 54 together with the third and fourth limit switches 36 and 38.

The pneumatic cylinder 51 is a two-port two-position type. The pneumatic cylinder 51 includes a main body 51a, a piston rod 58 partially inserted into the main body 51a, and a connecting mechanism 59 provided between the piston rod 58 and the first gate 34.

The main body 51a includes two ports including a first port 56 and a second port 57. The piston rod 58 moves (reciprocates) between a forward movement position shown in FIGS. 2A and 2D and a backward movement position shown in FIGS. 2B and 2C in accordance with the direction of the compressed air selectively supplied from one of the first and second ports 56 and 57. The connecting mechanism 59 converts reciprocating motion of the piston rod 58 into rotational motion or turning motion, and couples the piston rod 58 to the first gate 34. The first gate 34 coupled to the piston rod 58 via the connecting mechanism 59 can move between the advanced position and the retracted position described above in conjunction with the motion of the piston rod 58.

The direction control valve 52 is a five-port two-position spool valve, and is used to switch the flow of compressed air supplied from the compressor 53. The direction control valve 52 includes a main body 52a and a spool 60 housed inside the main body 52a.

The main body 52a includes five ports that open on its outer periphery, that is, a P port (air supply port) 61, E ports (exhaust ports) 62 and 63, an A port 64, and a B port 65.

Also, the main body 52a includes two ports that open at both ends in the axial direction, that is, a first port 66 and a second port 67. The P port 61 is coupled to the compressor 53, the A port 64 is coupled to the first port 56 of the pneumatic cylinder 51, and the B port 65 is coupled to the second port 57 of the pneumatic cylinder 51.

The first limit switch 33 is a three-port two-position normally closed limit switch, and can switch (turn on/off) the supply of compressed air from the compressor 53 to the first port 66 of the direction control valve 52. The first limit switch 33 includes a main body 33a, a spool 69 partially inserted into the main body 33a, the above-mentioned head 43 provided at the tip of the spool 69, and a spring 68 pressing the spool 69 in one direction (advancing direction).

The main body 33a includes three ports: a P port (air supply port) 70, an E port (exhaust port) 71, and an A port 72. The P port 70 is coupled to the compressor 53, and the A port 72 is coupled to the first port 66 of the direction control valve 52.

The second limit switch 35 is a three-port two-position normally closed limit switch, and can switch (turn on/off) the supply of compressed air from the compressor 53 to the second port 67 of the direction control valve 52. The second limit switch 35 includes a main body 35a, a spool 74 partially inserted into the main body 35a, the above-mentioned head 46 provided at the tip of the spool 74, and a spring 73 pressing the spool 74 in one direction (advancing direction).

The main body 35a includes three ports: a P port (air supply port) 75, an E port (exhaust port) 76, and an A port 77. The P port 75 is coupled to the compressor 53, and the A port 77 is coupled to the second port 67 of the direction control valve 52.

Figure 2A:
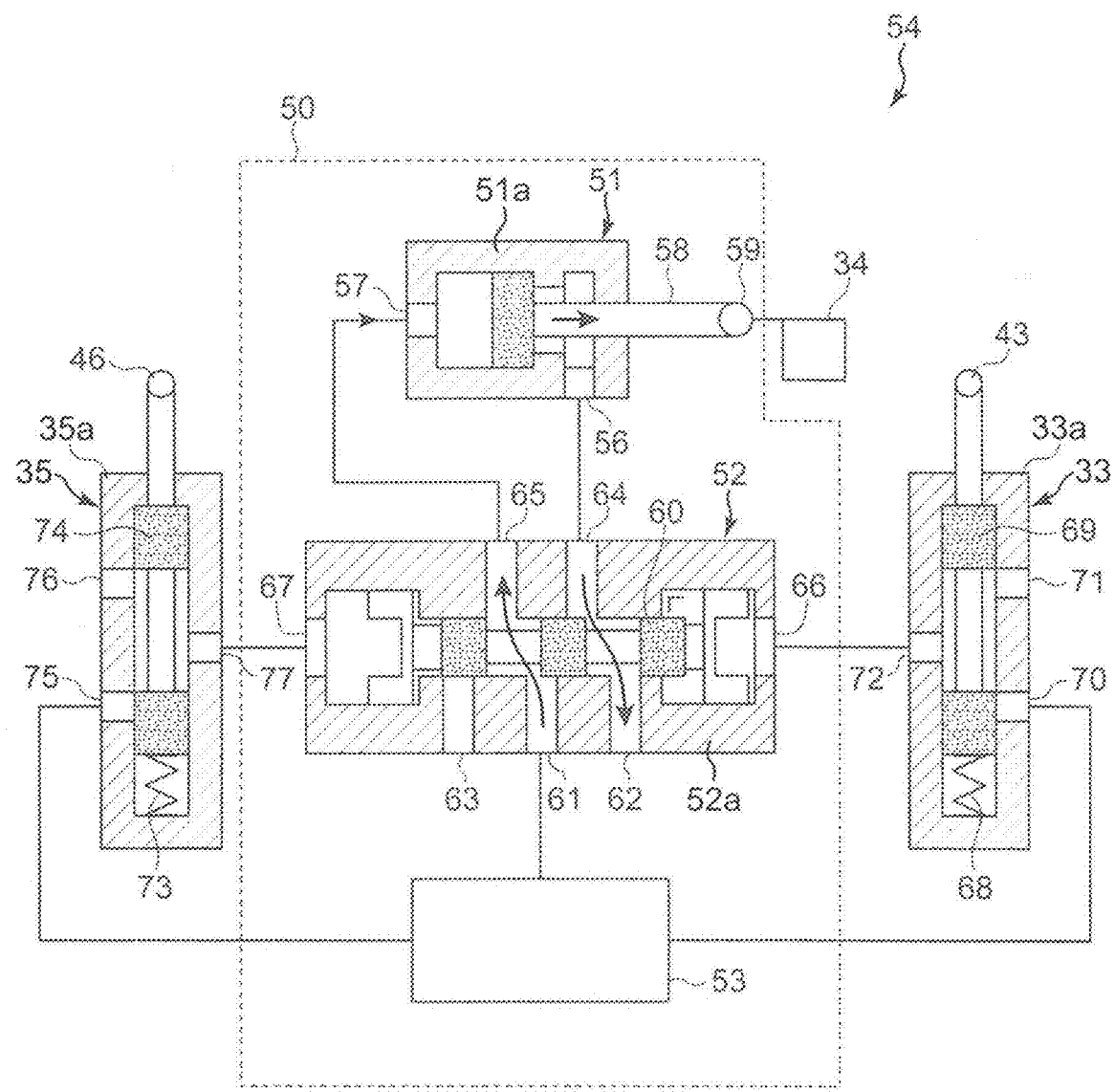
FIGS. 2A to 2D are schematic cross-sectional views for describing a structure and an operation of a pneumatic circuit including limit switches and a gate driving unit.

In the pneumatic circuit 54 having the above configuration, the spools 69 and 74 of the first and second limit switches 33 and 35 are both held at a closed position in a situation shown in FIG. 2A in which the first limit switch 33 has not detected the palette 15 and the second limit switch 35 has not detected the AGV 18. That is, the spools 69 and 74 close the P ports 70 and 75, respectively. Meanwhile, the direction control valve 52 is in a state in which the P port 61 communicates with the B port 65 and the E port 62 communicates with the A port 64 (hereinafter referred to as a first state). With this configuration, the compressed air from the compressor 53 is supplied to the second port 57 of the pneumatic cylinder 51, and the piston rod 58 of the pneumatic cylinder 51 is held at the illustrated position (forward movement position). The piston rod 58 at the forward movement position advances the first gate 34 to the AGV passage area 48.

Figure 2B:
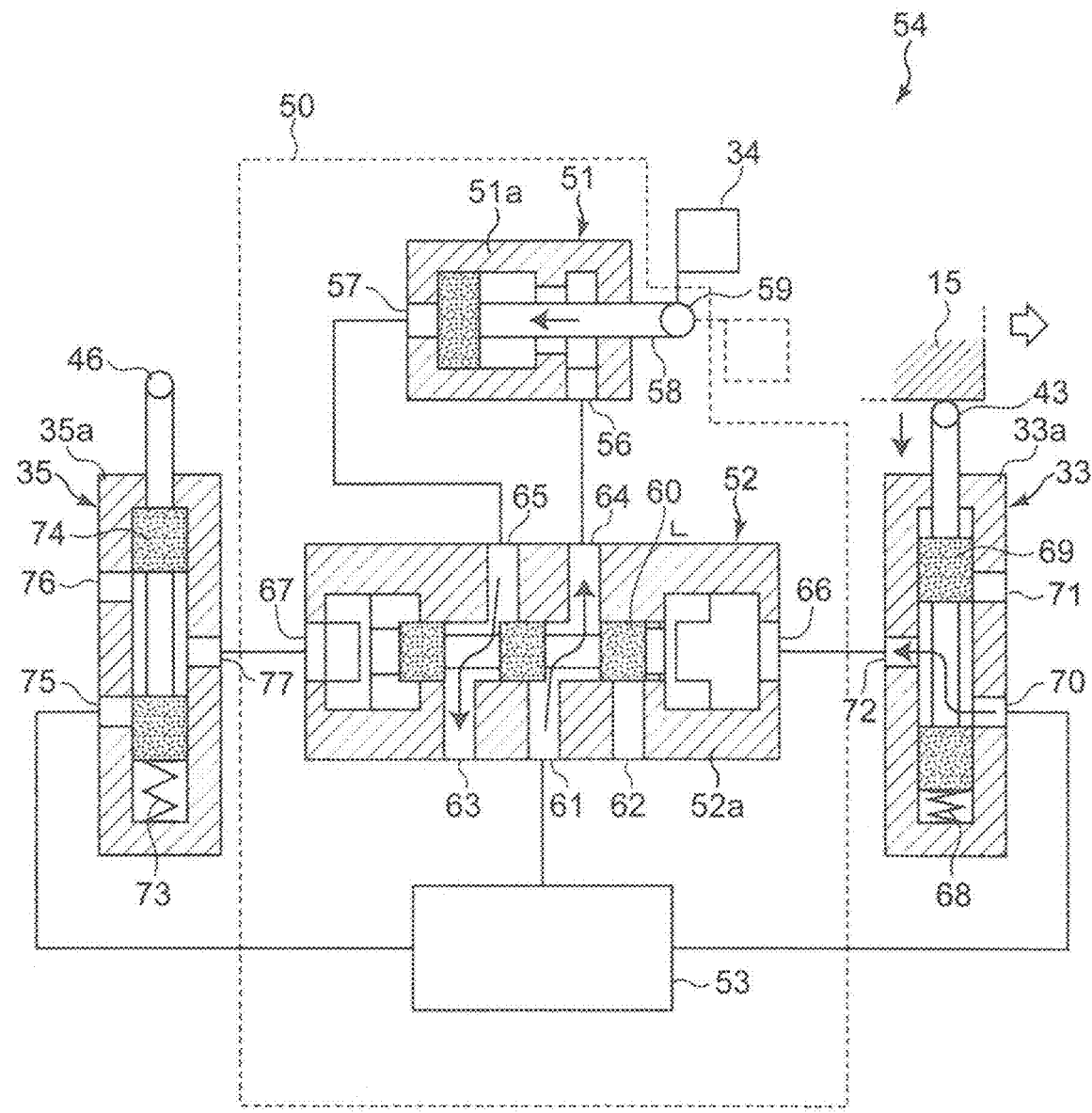

When the first limit switch 33 transitions from the state of FIG. 2A described above to a palette detection state in which the first limit switch 33 detects the palette 15, that is, the state of FIG. 2B in which the head 43 of the first limit switch 33 touches the palette 15, the head 43 is pressed by the palette 15, whereby the spool 69 of the first limit switch 33 moves backward against pressing force of the spring 68, and the P port 70 is opened. The first limit switch 33 in which the P port 70 is opened allows the compressed air supplied from the compressor 53 to flow into the first port 66 of the direction control valve 52 through the P port 70 and the A port 72. With this operation, the spool 60 of the direction control valve 52 moves leftward in FIG. 2B, providing a state in which the P port 61 communicates with the A port 64, and the E port 63 communicates with the B port 65 (hereinafter referred to as a second state). The direction control valve 52 in the second state allows the compressed air supplied from the compressor 53 to flow into the first port 56 of the pneumatic cylinder 51 through the P port 61 and the A port 64. With this operation, the piston rod 58 of the pneumatic cylinder 51 moves backward, and the first gate 34 moves from the advanced position to the retracted position.

Figure 2C:
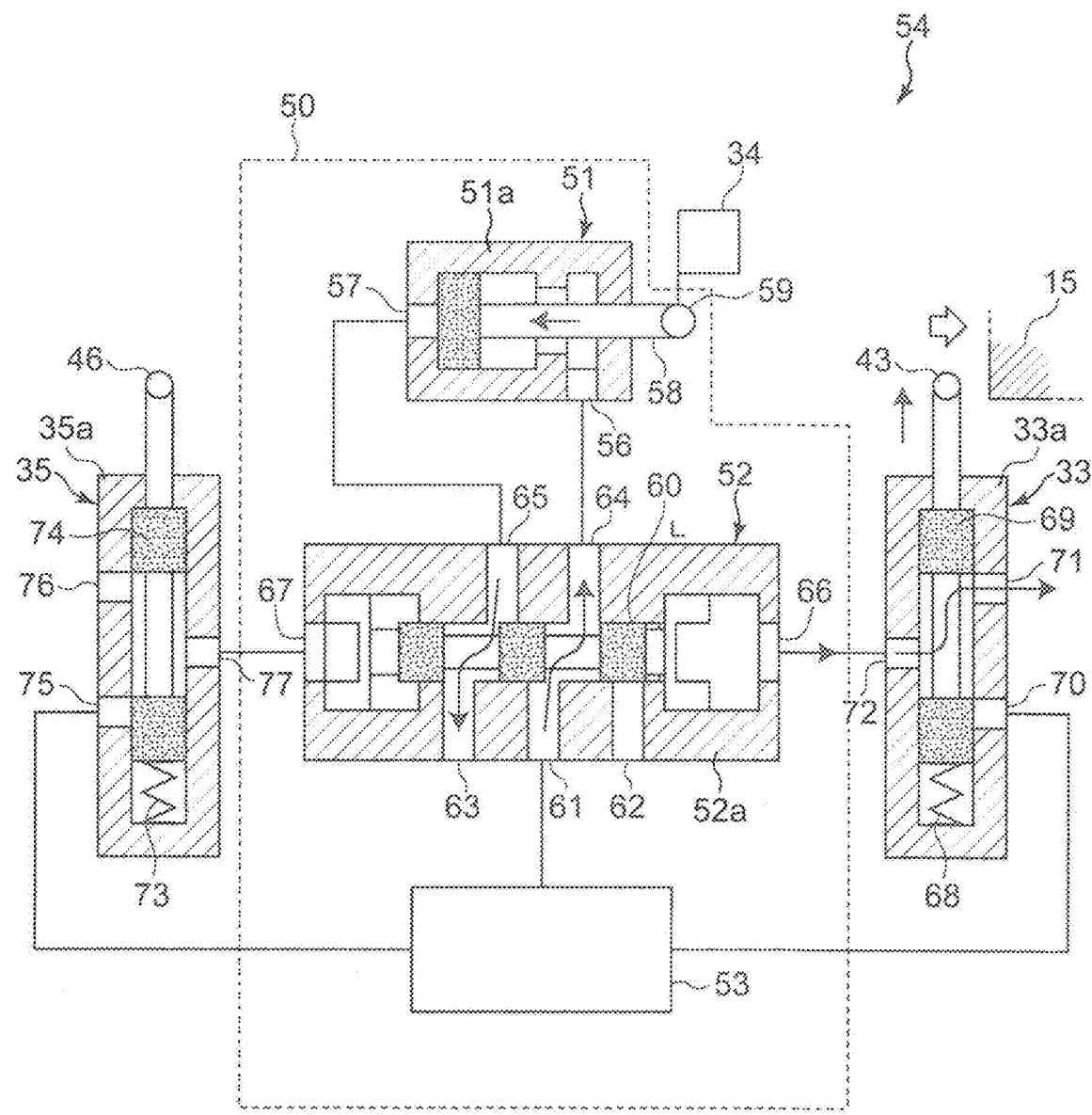

When the first limit switch 33 transitions from the state of FIG. 2B described above to a palette non-detection state in which the first limit switch 33 does not detect the palette 15, that is, the state of FIG. 2C in which the head 43 of the first limit switch 33 does not touch the palette 15, pressing force on the head 43 by the palette 15 is released, whereby the spool 69 of the first limit switch 33 is advanced by the pressing force of the spring 68, and the E port 71 is opened. With this operation, the compressed air is discharged from the first port 66 of the direction control valve 52 through the A port 72 and the E port 71 of the first limit switch 33. However, the discharge of the compressed air alone does not change the position of the spool 60 of the direction control valve 52, and the direction control valve 52 is maintained in the second state (state in which the P port 61 communicates with the A port 64, and the E port 63 communicates with the B port 65). As a result, the compressed air continues to be supplied to the first port 56 of the pneumatic cylinder 51, and the first gate 34 is maintained at the retracted position.

Figure 2D:
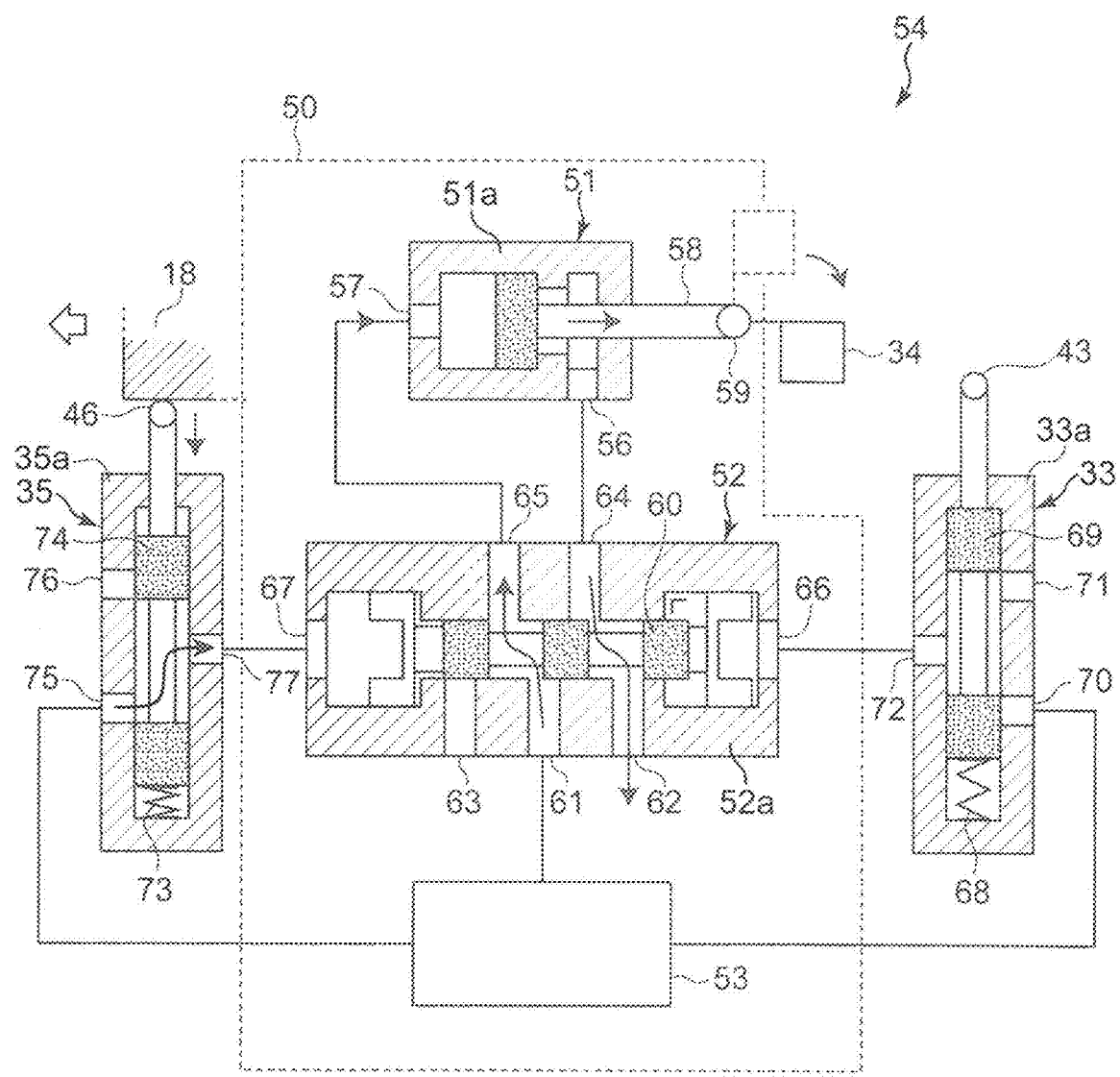

When the second limit switch 35 transitions from the state of FIG. 2C described above to an AGV detection state in which the second limit switch 35 detects the AGV 18, that is, the state of FIG. 2D in which the head 46 of the second limit switch 35 touches the AGV 18, the head 46 is pressed by the AGV 18, whereby the spool 74 of the second limit switch 35 moves backward against pressing force of the spring 73, and the P port 75 is opened. The second limit switch 35 in which the P port 75 is opened allows the compressed air supplied from the compressor 53 to flow into the second port 67 of the direction control valve 52 through the P port 75 and the A port 77. With this operation, the spool 60 of the direction control valve 52 moves rightward in FIG. 2D, providing the state in which the P port 61 communicates with the B port 65, and the E port 62 communicates with the A port 64 (first state). The direction control valve 52 in the first state allows the compressed air supplied from the compressor 53 to flow into the second port 57 of the pneumatic cylinder 51 through the P port 61 and the B port 65. As a result, the piston rod 58 of the pneumatic cylinder 51 advances, and the first gate 34 moves from the retracted position to the advanced position.

When the second limit switch 35 transitions from the state of FIG. 2D described above to an AGV non-detection state in which the second limit switch 35 does not detect the AGV 18, that is, the state of FIG. 2A in which the head 46 of the second limit switch 35 does not touch the AGV 18, pressing force on the head 46 by the AGV 18 is released, whereby the spool 74 of the second limit switch 35 is advanced by pressing force of the spring 73, and the E port 76 is opened. With this operation, the compressed air is discharged from the second port 67 of the direction control valve 52 through the A port 77 and the E port 76 of the second limit switch 35. However, the discharge of the compressed air alone does not change the position of the spool 60 of the direction control valve 52, and the direction control valve 52 is maintained in the first state (state in which the P port 61 communicates with the B port 65, and the E port 62 communicates with the A port 64). As a result, the compressed air continues to be supplied to the second port 57 of the pneumatic cylinder 51, and the first gate 34 is maintained at the advanced position.

The control operation of the first control device 31, that is, the operations of the first and second limit switches 33 and 35 and the gate driving unit 50 according to the detection result has been described above. Meanwhile, the control operation of the second control device 32, that is, the operations of the third and fourth limit switches 36 and 38 and the gate driving unit 55 according to the detection result is also similar.

[Speed Control of AGV]

Next, speed control of the AGV 18 according to a detection result of an obstacle will be described. The AGV controller 82 sets a deceleration area (deceleration distance) and a collision prevention area (collision prevention distance) ahead of the AGV 18. A size of the deceleration area (deceleration distance) is constant. Meanwhile, a size of the collision prevention area (collision prevention distance) is changed in accordance with a mode as described later. The AGV controller 82 also controls the speed of the AGV 18, more specifically, a rotation speed of the AGV motor 83 in accordance with the distance to the forward obstacle.

The speed control of the AGV 18 will be specifically described with reference to FIGS. 3 and 4. While the AGV 18 travels, the obstacle sensor 22 emits a laser beam or infrared rays forward of the AGV 18 as shown by the dashed arrow 84 in FIG. 3 to detect another AGV or an obstacle such as the gates 34 and 37 that are present ahead of the AGV 18. The AGV controller 82 determines whether an obstacle has been detected ahead of the AGV (forward obstacle) based on an input signal from the obstacle sensor 22 (step #1 in FIG. 4).

If it is determined as YES in step #1 and it is confirmed that a forward obstacle has been detected, the AGV controller 82 measures a forward separation distance L, which is a distance to the detected forward obstacle, and sets a deceleration area 85 and a collision prevention area 86 ahead of the AGV 18. The deceleration area 85 is an area having a section of a deceleration distance L1 and virtually set ahead of the AGV 18. The collision prevention area 86 is an area having a section of a collision prevention distance L2 and virtually set ahead of the AGV 18. The deceleration distance L1 is set at a constant value greater than the collision prevention distance L2.

Then, the AGV controller 82 determines whether the forward obstacle is inside the deceleration area 85, that is, whether the forward separation distance L from the AGV 18 to the forward obstacle is equal to or less than the deceleration distance L (step #2). If it is determined as NO in step #2 and it is confirmed that the forward obstacle is outside the deceleration area 85 (that is, L>L1), the AGV controller 82 sets an operation speed V of the AGV 18 at the first speed $V_{AGV}$, and causes the AGV 18 to travel at this first speed $V_{AGV}$ (step #3). As described above, the first speed $V_{AGV}$ is set at a value greater than the reference speed $V_R$ at which the conveyor 14 transports the palette 15 (product 13).

On the other hand, if it is determined as YES in step #2 and it is confirmed that the forward obstacle is inside the deceleration area 85 (that is, L≤L1), the AGV controller 82 decelerates the AGV 18 such that the operation speed V of the AGV 18 becomes a second speed $V_{AGV'}$ smaller than the first speed $V_{AGV}$ (step #4). In the present embodiment, the second speed $V_{AGV'}$ is set at a value substantially equal to the reference speed $V_R$ (equal to or slightly greater than $V_R$).

Then, the AGV controller 82 determines whether the forward obstacle is inside the collision prevention area 86, that is, whether the forward separation distance L from the AGV 18 to the forward obstacle is equal to or less than the collision prevention distance L2 (step #5). As described later, in the operation control system 10 according to the present embodiment, the collision prevention distance L2 is variable in accordance with an operation mode.

If it is determined as YES in step #5 and it is confirmed that the forward obstacle is inside the collision prevention area 86 (that is, L≤L2), the AGV controller 82 reduces the operation speed V of the AGV 18 to zero and stops the AGV 18 (step #6). With this operation, a space corresponding to the collision prevention area 86 (collision prevention distance L2) is secured between the AGV 18 and the forward obstacle. Note that since the AGV 18 substantially starts deceleration to stop when the forward obstacle enters the collision prevention area 86, a distance remaining between the AGV 18 and the forward obstacle when the AGV 18 stops is slightly smaller than the collision prevention distance L2. However, since the collision prevention distance L2 of the AGV 18 is considerably smaller than the deceleration distance L1, the distance remaining between the AGV 18 and the forward obstacle may be considered as the collision prevention distance L2.

Figure 5:
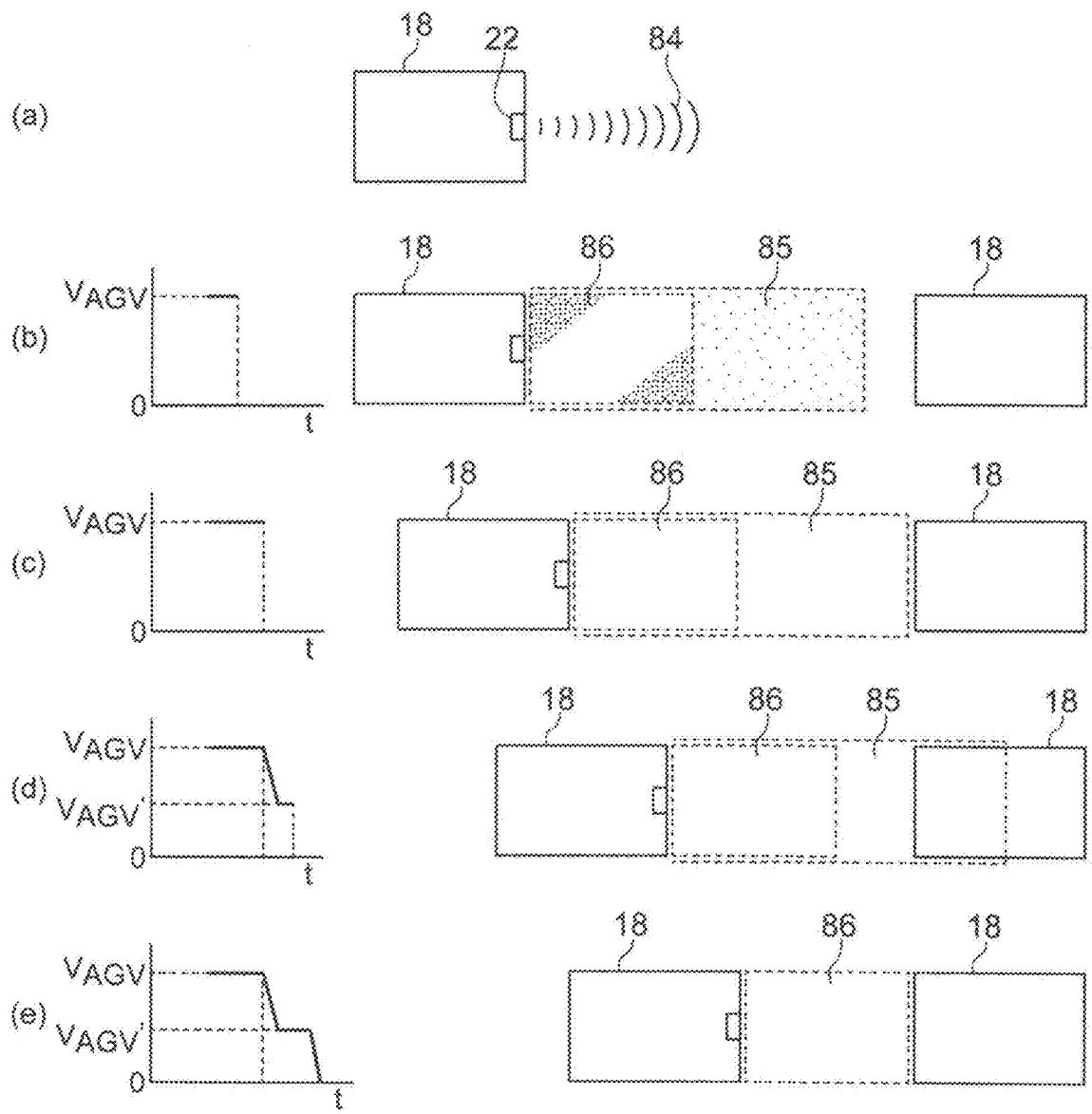
FIG. 5 is a schematic diagram for describing control according to a forward separation distance of the AGV.

As a result of the control as described above, the operation speed V of the AGV 18 changes, for example, in accordance with the distance between the AGV 18 and another AGV 18 preceding the AGV 18 (hereinafter referred to as a preceding AGV) as shown in FIG. 5. Charts (b) and (c) of FIG. 5 each show a state before the preceding AGV enters the deceleration area 85 of the AGV 18. In this state, the AGV 18 travels at a constant speed of the first speed $V_{AGV}$ ($V=V_{AGV}$). Meanwhile, as shown in chart (d) of FIG. 5, when the preceding AGV enters the deceleration area 85 of the AGV 18, the AGV 18 is decelerated until the operation speed V decreases from the first speed $V_{AGV}$ to the second speed $V_{AGV'}$. Furthermore, as shown in chart (e) of FIG. 5, when the preceding AGV enters the collision prevention area 86 of the AGV 18, the AGV 18 is stopped and the operation speed V decreases to zero.

[Switching of AGV Operation Mode]

Next, switching of the operation mode of the AGV 18 will be described. The operation control system 10 of the present embodiment has a unit that switches the operation mode of the AGV 18 between two predetermined modes (first mode and second mode).

As shown in FIG. 1, the mode switching unit includes a first magnetic medium 91 disposed downstream from the first transport point 19 in the AGV travel direction, and a second magnetic medium 92 disposed further downstream from the first magnetic medium 91. Note that the first magnetic medium 91 corresponds to "first detection body" in the present invention, and the second magnetic medium 92 corresponds to "second detection body" in the present invention. The first magnetic medium 91 is disposed adjacent to the AGV passage area 48 at a position separated to the upstream side from the first gate 34 by a first distance D1. The second magnetic medium 92 is disposed adjacent to the AGV passage area 48 at a position separated to the upstream side from the first gate 34 by a second distance D2. The second distance D2 is set sufficiently shorter than the first distance D1 but longer than the collision prevention distance L2.

As shown in FIG. 6, the AGV 18 includes a magnetic sensor 93 in addition to the magnetic sensor 21 that detects the second transport line 12. The magnetic sensor 93 reads information stored in the first magnetic medium 91 and the second magnetic medium 92, and is attached to a left surface of the AGV 18. Note that the magnetic sensor 93 corresponds to "position sensor" in the present invention.

The magnetic sensor 93 and the AGV controller 82 are connected by wire or wirelessly so as to be able to communicate with each other. The information read by the magnetic sensor 93 is transmitted to the AGV controller 82. The AGV controller 82 includes a storage unit 94 in which a mode switching program (see FIG. 7) described later is stored.

A combination of elements of the AGV 18 (magnetic sensor 93, AGV controller 82, storage unit 94) as described above and the magnetic media 91 and 92 described above constitute the mode switching unit that switches the operation mode of the AGV 18 between the first mode and the second mode.

In the present embodiment, the first magnetic medium 91 and the second magnetic medium 92 each hold different information. The difference in the information is embodied as, for example, a difference in a magnetic pole arrangement pattern between an N pole 95 and an S pole 96. From the difference in the magnetic pole arrangement pattern, the AGV controller 82 recognizes which of the first magnetic medium 91 and the second magnetic medium 92 the read information corresponds to.

Figure 7:
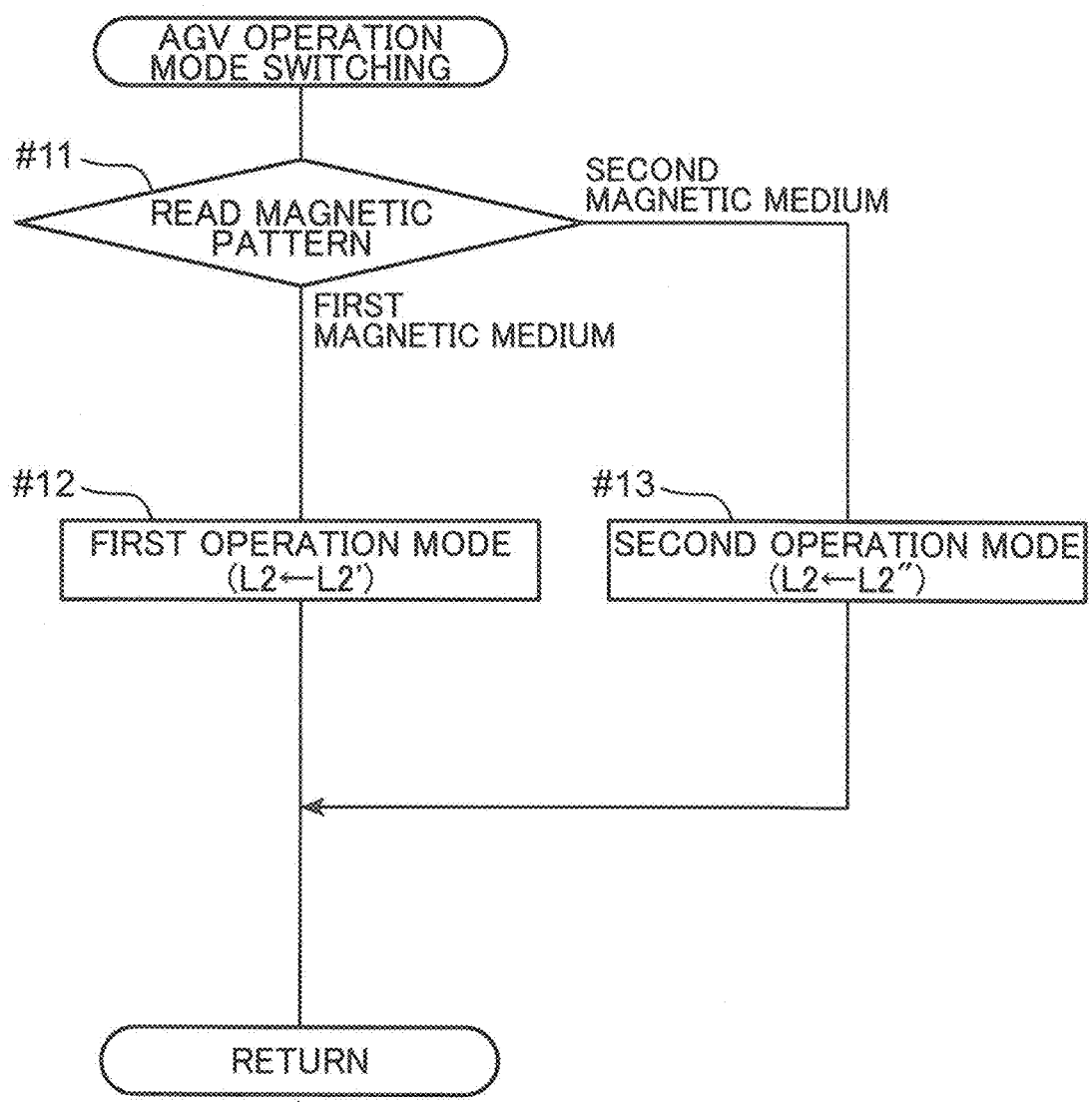
FIG. 7 is a flowchart showing control related to the switching of the operation mode of the AGV.

FIG. 7 is a flowchart showing a procedure for switching the operation mode of the AGV 18. As shown in FIG. 7, the AGV controller 82 first acquires the magnetic pattern read by the magnetic sensor 93 (step #11).

If the acquired magnetic pattern corresponds to the magnetic pole arrangement pattern of the magnetic medium 91, the AGV controller 82 selects the first operation mode as the operation mode of the AGV 18 (step #12). When the first operation mode is selected, the AGV controller 82 sets the collision prevention distance L2 at a first collision prevention distance L2' shown in FIG. 6. The first collision prevention distance L2' is equal to a value obtained by subtracting a longitudinal length $L_O$ of the AGV from the reference distance $L_R$, which is a standard distance between the palettes 15, that is, $L_R-L_O$.

On the other hand, if the acquired magnetic pattern corresponds to the magnetic pole arrangement pattern of the magnetic medium 92, the AGV controller 82 selects the second operation mode as the AGV operation mode (step #13). When the second operation mode is selected, the AGV controller 82 sets the collision prevention distance L2 at a second collision prevention distance L2" shown in FIG. 6. The second collision prevention distance L2" is shorter than the first collision prevention distance L2' (=$L_R-L_O$).

As described above, in the present embodiment, the collision prevention distance L2, which is the length of the collision prevention area 86, is variably set in accordance with the travel position of the AGV 18, and the collision prevention distance L2 decreases as the distance to the first gate 34 decreases. Meanwhile, the deceleration distance L1, which is the length of the deceleration area 85, is the same regardless of which of the first operation mode and the second operation mode.

[AGV Operation Control]

Next, with reference to FIG. 1 and FIGS. 8 to 11, operation control of the AGV 18 by the operation control system 10 having the above configuration will be described. Hereinafter, it is assumed that three palettes 15A, 15B, and 15C are transported sequentially from the top on the first transport line 11, and correspondingly three AGVs 18A, 18B, and 18C travel in this order on the second transport line 12.

FIG. 1 shows a state when the AGV 18C reaches the position of the first magnetic medium 91 (position where the magnetic sensor 93 detects the first magnetic medium 91). At this time, the preceding AGVs 18A and 18B are traveling between the first magnetic medium 91 and the second magnetic medium 92. In FIG. 1, it looks as if the leading AGV 18A has reached the position of the second magnetic medium 92 (position where the magnetic sensor 93 detects the second magnetic medium 92), but actually, it is assumed that the AGV 18A is traveling immediately before the position of the second magnetic medium 92.

When the AGV 18C reaches the position of the first magnetic medium 91, the magnetic sensor 93 of the AGV 18C detects the first magnetic medium 91, and the operation mode of the AGV 18C switches to the first mode. Thus, the collision prevention distance L2 of the AGV 18C is set at the first collision prevention distance L2', which is relatively long. This first collision prevention distance L2' is maintained until the magnetic sensor 93 of the AGV 18C detects the second magnetic medium 92. Therefore, at the time represented in FIG. 1, the collision prevention distances of the three AGVs 18A, 18B, and 18C between the first magnetic medium 91 and the second magnetic medium 92 are all set at the first collision prevention distance L2'.

Here, as described above, the collision prevention distance L2' is equal to a distance ($L_R-L_O$) obtained by subtracting the longitudinal length $L_O$ of the AGV 18 from the reference distance $L_R$, which is the standard distance between the palettes 15. Therefore, basically, the AGV 18C detects the preceding AGV 18B in the deceleration area 85, and the AGV 18B detects the preceding AGV 18A in the deceleration area 85. The leading AGV 18A also detects the first gate 34 in the deceleration area 85. Accordingly, the operation speed V of the AGVs 18A, 18B, and 18C at the time represented in FIG. 1 is the second speed $V_{AGV'}$ substantially equal to the reference speed $V_R$, which is the transport speed of the palette 15 by the conveyor 14. As a result, the AGVs 18A, 18B, and 18C travel in synchronization with the corresponding palettes 15A, 15B, and 15C, respectively, at the time represented in FIG. 1. That is, the AGVs 18A, 18B, and 18C travel side by side with the corresponding palettes 15A, 15B, and 15C, respectively, while maintaining distances between vehicles substantially constant.

Immediately after the time represented in FIG. 1, the leading AGV 18A reaches the position of the second magnetic medium 92. As a result, the magnetic sensor 93 of the AGV 18A detects the second magnetic medium 92, and the operation mode of the AGV 18A switches from the first mode to the second mode. That is, the collision prevention distance L2 of the AGV 18A changes to the second collision prevention distance L2" (<first collision prevention distance L2'), which is relatively short.

At this time, both the first and second limit switches 33 and 35 of the first control device 31 are in the non-detection state (state in which the detection target is not in touch), and both the third and fourth limit switches 36 and 38 of the second control device 32 are in the non-detection state. This allows each of the first gate 34 and the second gate 37 to move to the advanced position. Therefore, the leading AGV 18A detects the first gate 34 as an obstacle, and is controlled to maintain the distance to the first gate 34 equal to or greater than the second collision prevention distance L2". Then, the AGV 18A stops when the distance to the first gate 34 becomes the second collision prevention distance L2".

Figure 8:
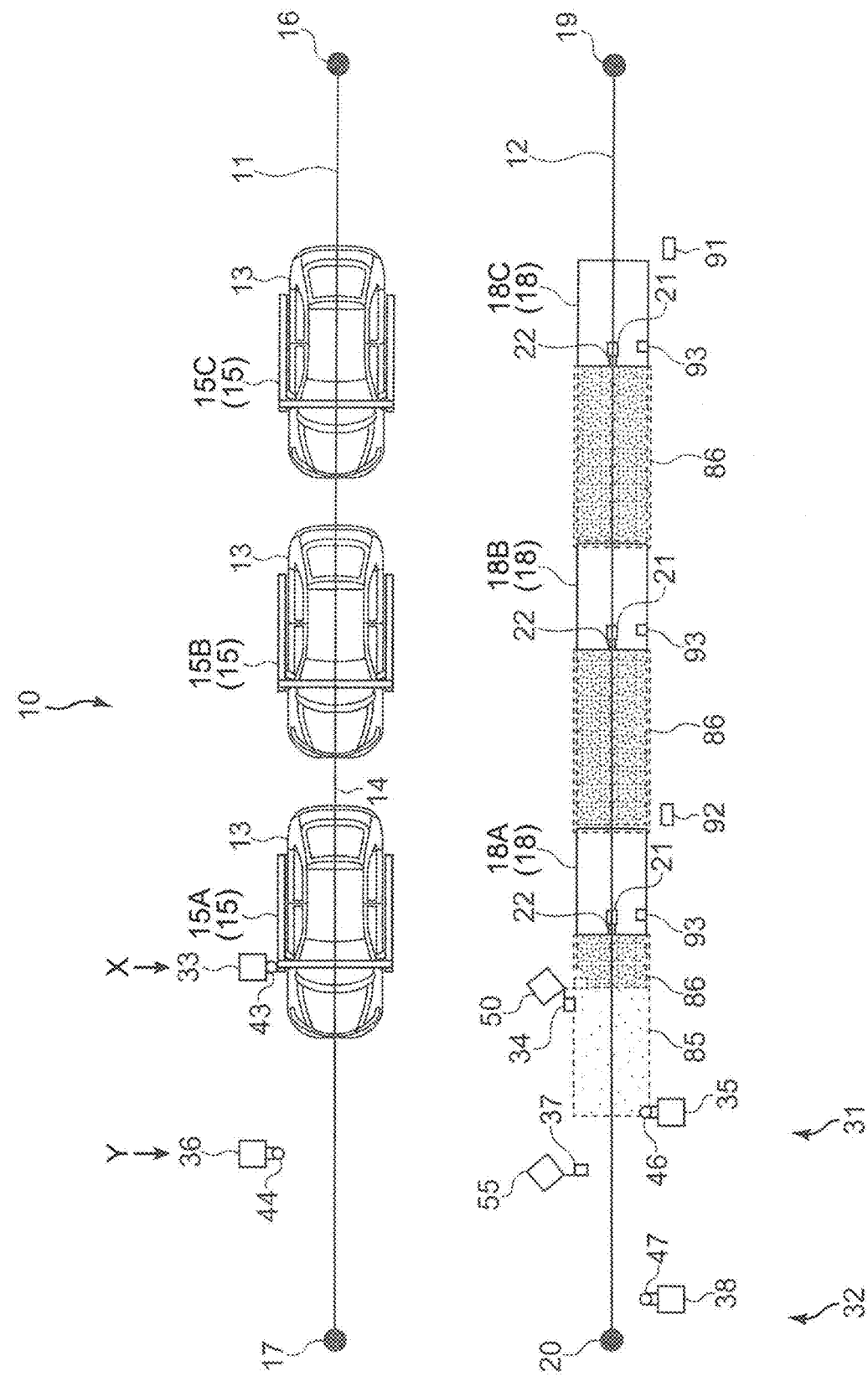
FIG. 8 is an operation diagram showing an operation of the AGV in time series (part 1)

Slightly later than or almost simultaneously with the stop of the AGV 18A, as shown in FIG. 8, the leading palette 15A moving on the first transport line 11 reaches a position of touching the first limit switch 33 of the first control device 31, that is, the first reference position X. The palette 15A having reached the first reference position X is side by side with the AGV 18A that has stopped before the first gate 34 (position separated to the upstream side from the first gate 34 by the second collision prevention distance L2"). In other words, the first gate 34 is disposed at such a position that the AGV 18 and the palette 15 are side by side, where the AGV 18 has reached the position separated to the upstream side from the first gate 34 by the second collision prevention distance L2" on the second transport line 12, and the palette 15 has reached the first reference position X on the first transport line 11.

Figure 9:
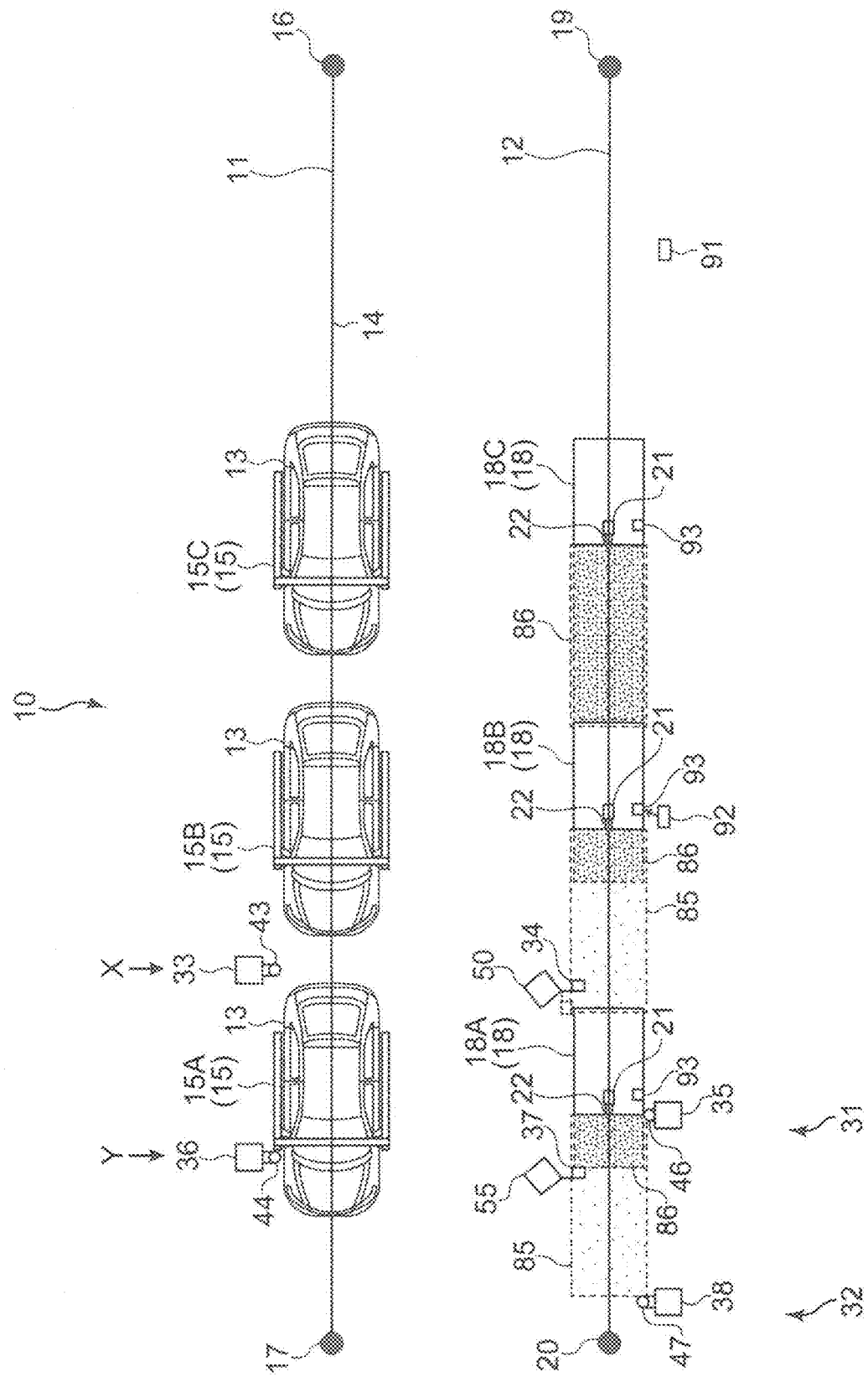
FIG. 9 is an operation diagram showing the operation of the AGV in time series (part 2)

When the palette 15A reaches the first reference position X, the palette 15A touches the head 43 of the first limit switch 33, and the position of the first gate 34 switches from the advanced position to the retracted position. This permits the AGV 18A to travel (advance), as shown in FIG. 9, and the AGV 18A passes the first gate 34. At this time, when the second gate 37 is detected in the deceleration area 85 of the AGV 18A, the operation speed V of the AGV 18A is set at the second speed $V_{AGV'}$, which is substantially equal to (equal to or slightly larger than) the reference speed $V_R$. That is, the AGV 18A passes the first gate 34 at the second speed $V_{AGV'}$.

After the AGV 18A passes the first gate 34, as shown in FIG. 9, the AGV 18A touches the head 46 of the second limit switch 35. This allows the first gate 34 to move from the retracted position to the advanced position. This prohibits the succeeding AGV 18B from passing the first gate 34 prior to the corresponding palette 15B.

When the succeeding AGV 18B reaches the position of the second magnetic medium 92, the operation mode of the AGV 18B is switched from the first mode to the second mode. Meanwhile, the leading AGV 18A detects the second gate 37 of the second control device 32 and stops. That is, the AGV 18A stops at a position separated to the upstream side from the second gate 37 by the second collision prevention distance L2".

Figure 10:
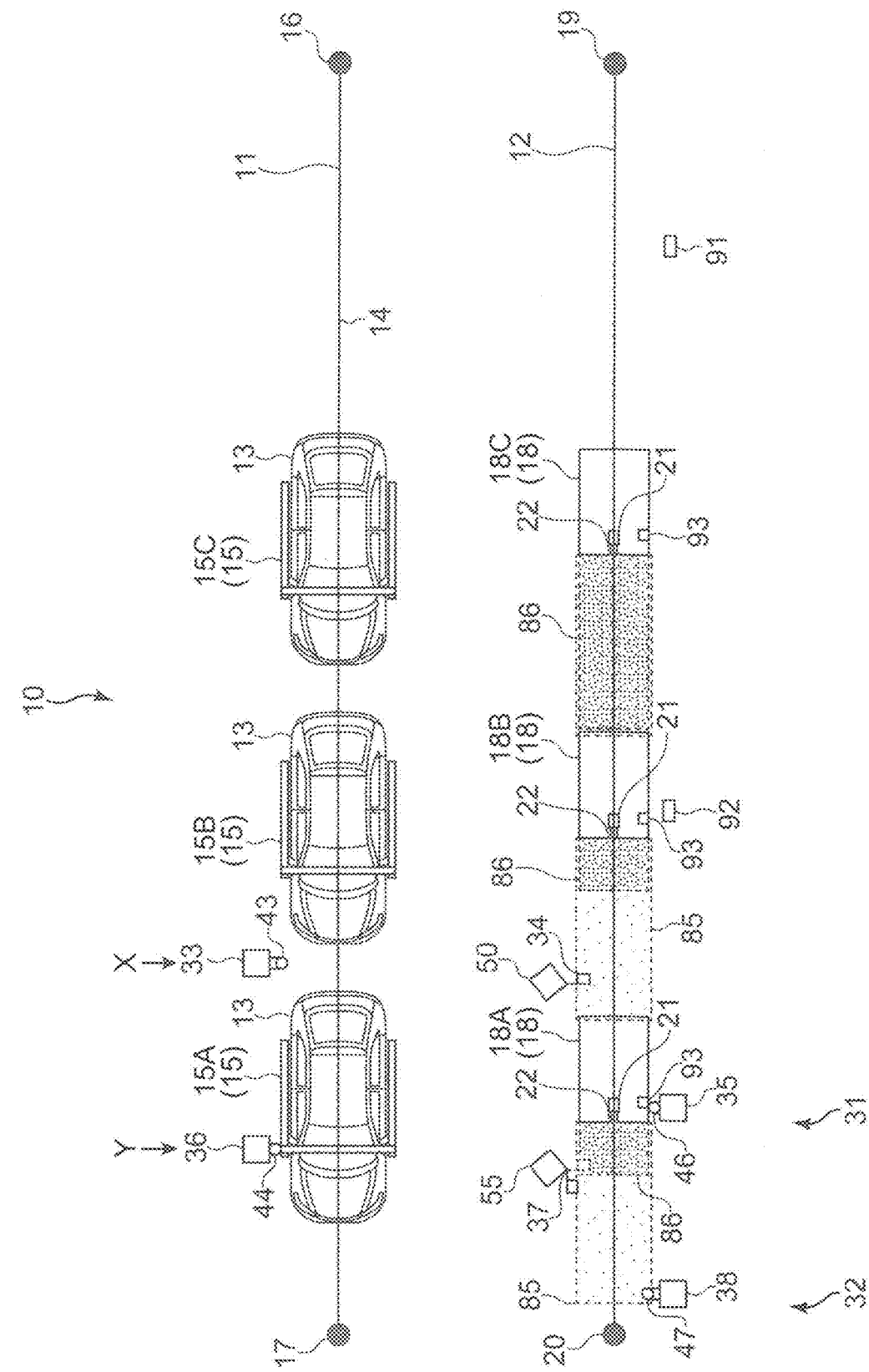
FIG. 10 is an operation diagram showing the operation of the AGV in time series (part 3)

Slightly later than or almost simultaneously with the stop of the AGV 18A, as shown in FIG. 10, the leading palette 15A moving on the first transport line 11 reaches a position of touching the third limit switch 36 of the second control device 32, that is, the second reference position Y. The palette 15A having reached the second reference position Y is side by side with the AGV 18A that has stopped before the second gate 37 (position separated to the upstream side from the second gate 37 by the second collision prevention distance L2"). In other words, the second gate 37 is disposed at such a position that the AGV 18 and the palette 15 are side by side, where the AGV 18 has reached the position separated to the upstream side from the second gate 37 by the second collision prevention distance L2" on the second transport line 12, and the palette 15 has reached the second reference position Y on the first transport line 11.

Figure 11:
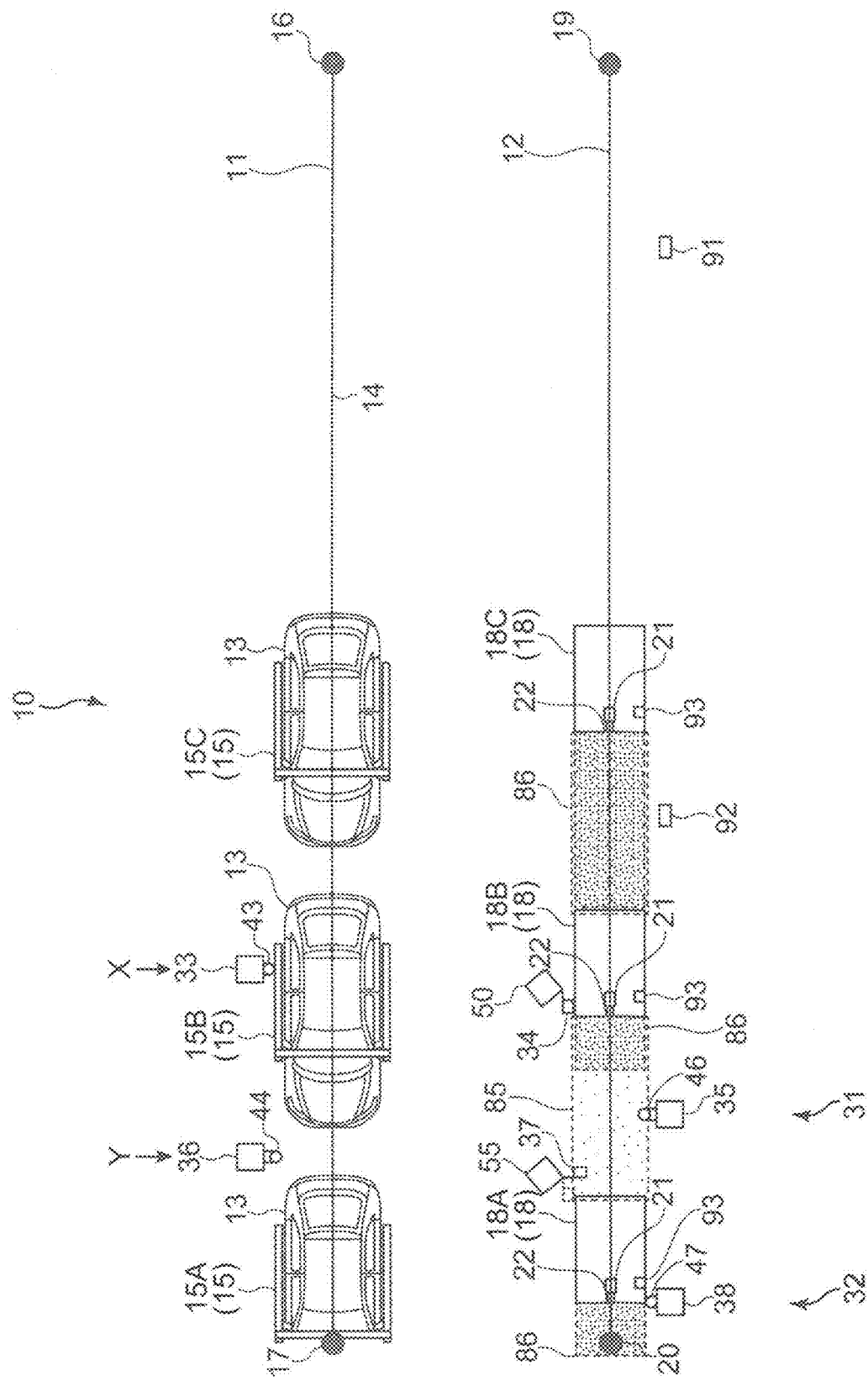
FIG. 11 is an operation diagram showing the operation of the AGV in time series (part 4).

When the palette 15A reaches the second reference position Y, the palette 15A touches the head 44 of the third limit switch 36, and the position of the second gate 37 switches from the advanced position to the retracted position. This permits the AGV 18A to travel (advance), as shown in FIG. 11, and the AGV 18A passes the second gate 37. After passing the second gate 37, the AGV 18A touches the head 47 of the fourth limit switch 38, and causes the second gate 37 to move from the retracted position to the advanced position. This prohibits the succeeding AGV 18B from passing the second gate 37 prior to the corresponding palette 15B.

Next, as shown in FIG. 11, when the palette 15B touches the head 43 of the first limit switch 33 of the first control device 31, the position of the first gate 34 switches from the advanced position to the retracted position. This permits the AGV 18B to travel (advance), and the AGV 18B passes the first gate 34. At this time, when the second gate 37 is detected in the deceleration area 85 of the AGV 18B, the operation speed V of the AGV 18B is set at the second speed $V_{AGV'}$, which is substantially equal to (equal to or slightly larger than) the reference speed $V_R$. That is, the AGV 18B passes the first gate 34 at the second speed $V_{AGV'}$.

Thereafter, the above-described processing is repeatedly performed, and the palettes 15 and the corresponding AGVs 18 sequentially pass on the first transport line 11 and the second transport line 12, respectively.

As described above, in the present embodiment, the second transport line 12 is installed in parallel to the first transport line 11 on which the plurality of palettes 15 (products 13) is transported by the conveyor 14. The plurality of self-propelled AGVs 18 traveling on the second transport line 12 is controlled such that the forward separation distance L, which is the separation distance to obstacles ahead (preceding AGV 18 or gates 34 and 37), is equal to or greater than the collision prevention distance L2 (first collision prevention distance L2' or second collision prevention distance L2"). On the first transport line 11, the pneumatic first limit switch 33 (third limit switch 36) is installed to detect that the palette 15 has reached the first reference position X (second reference position Y). At the position corresponding to the first limit switch 33 (third limit switch 36) on the second transport line 12, the first gate 34 (second gate 37) that moves from the advanced position to the retracted position in response to the detection of the palette 15 by the first limit switch 33 (third limit switch 36) is disposed. Such a configuration has an advantage that the plurality of AGVs 18 can be transported in synchronization with the plurality of corresponding palettes 15 (products 13) without being affected by radio interference or the like.

That is, in the above embodiment, the first gate 34 (second gate 37) is held at the advanced position unless the palette 15 is detected by the first limit switch 33 (third limit switch 36). Therefore, until the palette 15 reaches the first reference position X (second reference position Y) corresponding to the first limit switch 33 (third limit switch 36), the AGV 18 is prohibited from traveling beyond the first gate 34 (second gate 37). Then, when the palette 15 having reached the first reference position X (second reference position Y) is detected by the first limit switch 33 (third limit switch 36), the first gate 34 (second gate 37) moves to the retracted position, and the AGV 18 is permitted to travel. In other words, the travel of the AGV 18 is controlled such that the AGV 18 and the palette 15 are arranged side by side at the first reference position X (second reference position Y). The degree of synchronization between the product 13 loaded on the palette 15 and the AGV 18 is thereby improved, and an unnecessary increase in the distance between the product 13 and the AGV 18 is avoided. Therefore, the distance for transporting parts unloaded from the AGV 18 to the corresponding product 13 can be shortened as much as possible, and the efficiency of assembly work can be improved.

In particular, in the above embodiment, the travel of the self-propelled AGVs 18 each including a control device for travel (AGV controller 82) is controlled (prohibited/permitted) using the gates 34 and 37 that are advanced or retracted depending on the detection result of the limit switches 33 and 36. Therefore, it is possible to stably operate the AGVs 18 by a method less expensive than a method of, for example, centrally controlling the plurality of AGVs 18 by using wireless communication and a centralized control computer.

That is, in a case where a method using wireless communication and a centralized control computer is employed instead of the above embodiment, the following problems may occur. For example, crosstalk with other radio communication may hamper communication for AGV control. An error in positional information of some AGVs may cause a discrepancy between an AGV operation plan and an actual operation situation. A failure in the centralized control computer may disable the whole operation control system from functioning. Meanwhile, in the above embodiment using the pneumatic (mechanical) limit switches 33 and 36 that detect the positions of the palettes 15 and the gates 34 and 37 that can be advanced or retracted, the problems as described above can be effectively avoided, and it is possible to stably maintain a state in which the AGVs 18 travel in synchronization with the palettes 15 (products 13).

Also, in the above embodiment, the second limit switch 35 (fourth limit switch 38) is installed at a position on the downstream side from the first gate 34 (second gate 37) by a predetermined distance on the second transport line 12. When the AGV 18 is detected by the second limit switch 35 (fourth limit switch 38) and the palette 15 is not detected by the first limit switch 33 (third limit switch 36), the first gate 34 (second gate 37) moves to the advanced position. Such a configuration makes it possible to correctly control (prohibit/permit) the travel of the succeeding AGV by using the advanced first gate 34 (second gate 37) such that another AGV 18 (succeeding AGV) following the AGV 18 having passed the first gate 34 (second gate 37) does not travel prior to the corresponding palette 15, and to ensure good synchronization between the plurality of AGVs 18 and the plurality of palettes 15 (products 13).

Also, in the above embodiment, on the upstream side of the first gate 34 on the second transport line 12, the first magnetic medium 91 and the second magnetic medium 92 are arranged in this order from the upstream side, and the magnetic sensor 93 that can detect the magnetic media 91 and 92 is installed in each of the plurality of AGVs 18. Then, when the magnetic sensor 93 detects the first magnetic medium 91, the collision prevention distance L2 of the AGV 18 is set at the first collision prevention distance L2'. When the magnetic sensor 93 detects the second magnetic medium 92, the collision prevention distance L2 of the AGV 18 is set at the second collision prevention distance L2" shorter than the first collision prevention distance L2'. With such a configuration, since the collision prevention distance L2 decreases (is changed from L2' to L2") as the distance to the first gate 34 decreases, when the AGV 18 detects the first gate 34 at the advanced position and stops, the distance between the AGV 18 and the first gate 34 can be relatively short. This makes it possible to reduce the misalignment between the palette 15 and the corresponding AGV 18 as much as possible, and to further improve the efficiency of assembly work.

The preferred embodiment of the present invention has been described above, but the present invention is not limited to the above embodiment, and various changes can be made.

In the above embodiment, the traveling direction of the AGV 18 has been controlled by detecting the magnet tape laid along the second transport line 12 with the magnetic sensor 21. However, the method of guiding the AGV 18 is not limited to this method. For example, instead of the combination of the magnet tape and the magnetic sensor as in the above embodiment, a combination of a white tape and an optical sensor that detects the white tape may be used.

In the above embodiment, the first control device 31 and the second control device 32 have been installed as a unit for synchronizing the AGV 18 with the palette 15. However, the travel of the AGV 18 may be controlled by one control device. However, installing two or more control devices is advantageous in that the AGV 18 and the palette 15 can be synchronized more reliably, in other words, that the AGV 18 can travel while stably keeping a state where the AGV 18 and the palette 15 are close to each other.

In the above embodiment, the magnetic media 91 and 92 (detection bodies) have been disposed on the second transport line 12, and the magnetic sensor 93 (position sensor) that identifies the position of the AGV 18 by detecting the magnetic media 91 and 92 have been installed on the side surface of the AGV 18. However, the method of identifying the position of the AGV 18 is not limited to this method. For example, instead of the magnetic medium, a quick response (QR) code (registered trademark) may be disposed as the detection body, and the QR code may be detected by an image recognition device provided in the AGV.

In the above embodiment, the pneumatic (mechanical) limit switches 33, 35, 36, and 38 have been used as detectors that detect the palette 15 or the AGV 18, and the pneumatic gate driving units 50 and 55 including the direction control valve 52 have been used as a unit for driving the gates 34 and 37. However, as the limit switch and the gate driving unit, those using fluid can be suitably used. For example, hydraulic limit switches and gate driving units may be used.

SUMMARY

The above embodiment is summarized as follows.

An operation control system according to the above embodiment is applied to a facility including: a first transport line on which a plurality of transport bodies is transported by a transport mechanism at a predetermined reference speed while being separated at a predetermined reference distance; and a second transport line on which a plurality of self-propelled carrier bodies travels, the second transport line being provided in parallel to the first transport line. The operation control system causes the plurality of carrier bodies to travel in synchronization with the plurality of transport bodies. The operation control system includes: an obstacle sensor provided in each of the plurality of carrier bodies and configured to detect an obstacle present ahead of each of the carrier bodies; an autonomous traveling control unit provided in each of the plurality of carrier bodies and configured to control the travel of each of the carrier bodies based on an input signal from the obstacle sensor; a gate provided on the second transport line and movable between an advanced position advanced to a detection range by the obstacle sensor and a retracted position out of the detection range by the obstacle sensor, a first detector configured to detect each of the transport bodies that has reached a predetermined reference position on the first transport line; and a gate driving unit configured to move the gate to the retracted position when the first detector detects the transport body, and to move the gate to the advanced position when the first detector does not detect the transport body. When a distance between any of the carrier bodies and another carrier body or the obstacle ahead of the carrier body is defined as a forward separation distance, the autonomous traveling control unit controls the travel of the carrier body such that the forward separation distance is equal to or greater than a predetermined collision prevention distance. The gate is disposed at a position where the carrier body having reached a position separated to an upstream side from the gate at the collision prevention distance on the second transport line, and the transport body having reached the reference position on the first transport line are side by side.

According to the present system, since the gate is held at the advanced position unless the first detector detects the transport body, the carrier body is prohibited from traveling beyond the gate until the transport body reaches the reference position corresponding to the first detector. Then, when the first detector detects the transport body that has reached the reference position, the gate moves to the retracted position, and the carrier body is permitted to travel. This makes it possible to control the travel of the carrier body such that the carrier body and the transport body are side by side at the reference position, and to improve the degree of synchronization between the transport body and the carrier body.

In particular, the travel of the self-propelled carrier bodies each including a control device for travel (autonomous traveling control unit) is controlled (prohibited/permitted) using the gate that is advanced or retracted depending on a detection result of the first detector. Therefore, it is possible to stably operate the carrier bodies by a method less expensive than a method of, for example, centrally controlling the plurality of carrier bodies by using wireless communication and a centralized control computer.

That is, in a case where the method using wireless communication and a centralized control computer is employed instead of the present invention, the following problems may occur. For example, crosstalk with other radio communication may hamper communication for carrier body control. An error in positional information of some carrier bodies may cause a discrepancy between a carrier body operation plan and an actual operation situation. A failure in the centralized control computer may disable the whole operation control system from functioning. Meanwhile, in the present system using the first detector that detects the position of the transport body and the gate that can be advanced or retracted, the problems as described above can be effectively avoided, and it is possible to stably maintain a state in which the carrier body travels in synchronization with the transport body.

Preferably, the operation control system further includes a second detector configured to detect the carrier body having reached a position downstream from the gate at a predetermined distance on the second transport line, and the gate driving unit moves the gate to the advanced position when the first detector does not detect the transport body and the second detector detects the carrier body.

Such a configuration makes it possible to correctly control (prohibit/permit) the travel of the succeeding carrier body by using the advanced gate such that another carrier body (succeeding carrier body) following the carrier body having passed the gate does not travel prior to the corresponding transport body, and to ensure good synchronization between the plurality of carrier bodies and the plurality of transport bodies.

The first detector and the second detector are preferably mechanical limit switches. In this case, the gate driving unit may include: a cylinder device driven by a fluid; and a direction control valve that switches a flow of the fluid supplied to the cylinder device in response to on/off of the limit switches.

Preferably, the operation control system further includes: a first detection body provided at a position separated to an upstream side from the gate at a first distance on the second transport line; a second detection body provided at a position separated to an upstream side from the gate at a second distance shorter than the first distance on the second transport line; and a position sensor provided in each of the plurality of carrier bodies and configured to detect the first detection body and the second detection body. When the position sensor detects the first detection body, the autonomous traveling control unit may set the collision prevention distance at a first collision prevention distance. When the position sensor detects the second detection body, the autonomous traveling control unit may set the collision prevention distance at a second collision prevention distance shorter than the first collision prevention distance.

With this configuration, since the collision prevention distance decreases as the distance to the gate decreases, when the carrier body detects the gate at the advanced position and stops, the distance between the carrier body and the gate can be relatively short. This makes it possible to reduce the misalignment between the transport body and the corresponding carrier body as much as possible, and to further improve the efficiency of assembly work.

This application is based on Japanese Patent application No. 2018-183992 filed in Japan Patent Office on Sep. 28, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An operation control system including: a first transport line on which a plurality of transport bodies is transported by a transport mechanism at a predetermined reference speed while being separated at a predetermined reference distance; and a second transport line on which a plurality of self-propelled carrier bodies travels, the second transport line being provided in parallel to the first transport line, the operation control system causing the plurality of carrier bodies to travel in synchronization with the plurality of transport bodies, the operation control system comprising:
    an obstacle sensor provided in each of the plurality of carrier bodies and configured to detect an obstacle present ahead of each of the carrier bodies;
    an autonomous traveling control unit provided in each of the plurality of carrier bodies and configured to control the travel of each of the carrier bodies using an input signal from the obstacle sensor;
    a gate provided on the second transport line and movable between an advanced position advanced to a detection range by the obstacle sensor and a retracted position out of the detection range by the obstacle sensor;
    a first detector configured to detect each of the transport bodies that has reached a predetermined reference position on the first transport line; and
    a gate driving unit configured to move the gate to the retracted position when the first detector detects a transport body of the plurality of transport bodies, and to move the gate to the advanced position when the first detector does not detect the transport body,
    wherein when a distance between a carrier body of the plurality of carrier bodies and another carrier body of the plurality of carrier bodies or an obstacle ahead of the carrier body is defined as a forward separation distance, the autonomous traveling control unit controls the travel of the carrier body such that the forward separation distance is equal to or greater than a predetermined collision prevention distance, and the gate is disposed at a position where, when the carrier body reaches a position on an upstream side from the gate at the collision prevention distance on the second transport line, and the transport body reaches the reference position on the first transport line, the carrier body and the transport body are side by side.

2. The operation control system according to claim 1, further comprising:
- a first detection body provided at a position on an upstream side from the gate at a first distance on the second transport line;
- a second detection body provided at a position on an upstream side from the gate at a second distance shorter than the first distance on the second transport line; and
- a position sensor provided in each of the plurality of carrier bodies and configured to detect the first detection body and the second detection body, wherein when the position sensor detects the first detection body, the autonomous traveling control unit sets the collision prevention distance at a first collision prevention distance, and when the position sensor detects the second detection body, the autonomous traveling control unit sets the collision prevention distance at a second collision prevention distance shorter than the first collision prevention distance.

3. The operation control system according to claim 1, further comprising
- a second detector configured to detect the carrier body having reached a position downstream from the gate at a predetermined distance on the second transport line, wherein the gate driving unit moves the gate to the advanced position when the first detector does not detect the transport body and the second detector detects the carrier body.

4. The operation control system according to claim 3, wherein
- the first detector and the second detector are mechanical limit switches, and
- the gate driving unit includes: a cylinder device driven by a fluid; and a direction control valve that switches a flow of the fluid supplied to the cylinder device in response to on/off of the limit switches.

* * * * *